United States Patent
Baldassari et al.

(10) Patent No.: US 7,516,889 B2
(45) Date of Patent: Apr. 14, 2009

(54) SYSTEMS AND METHODS FOR PACKAGE SORTATION AND DELIVERY USING RADIO FREQUENCY IDENTIFICATION TECHNOLOGY

(75) Inventors: Anthony Baldassari, Denville, NJ (US); Duane Anderson, Cockeysville, MD (US); Robert Peters, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 207 days.

(21) Appl. No.: 11/464,985

(22) Filed: Aug. 16, 2006

(65) Prior Publication Data

US 2007/0012602 A1    Jan. 18, 2007

Related U.S. Application Data

(62) Division of application No. 10/439,672, filed on May 16, 2003, now Pat. No. 7,118,034.
(60) Provisional application No. 60/381,485, filed on May 16, 2002.

(51) Int. Cl.
G06K 15/00 (2006.01)
G06F 17/00 (2006.01)
G06F 19/00 (2006.01)
G06Q 30/00 (2006.01)
G06Q 90/00 (2006.01)

(52) U.S. Cl. .................. 235/383; 235/385; 235/375; 235/487

(58) Field of Classification Search .................. 235/383, 235/385, 375, 435, 454; 700/223–226; 340/572.1, 340/5.6, 5.92; 209/583, 584, 900; 705/22, 705/28, 401, 406

See application file for complete search history.

(56) References Cited

U.S. PATENT DOCUMENTS

| 3,438,489 A | 4/1969 | Cambornac et al. |
| 4,058,217 A | 11/1977 | Vaughan et al. |
| 4,641,753 A | 2/1987 | Tamada |
| 4,672,553 A | 6/1987 | Goldberg |
| 4,832,204 A * | 5/1989 | Handy et al. .................. 209/3.3 |
| 5,068,797 A | 11/1991 | Sansone et al. |

(Continued)

FOREIGN PATENT DOCUMENTS

DE    10003314 A1    1/2000

(Continued)

OTHER PUBLICATIONS

Summons to Attend Oral Proceedings for EP Application No. 03724586.7 based on PCT/US03/15299.

(Continued)

*Primary Examiner*—Daniel Walsh
(74) *Attorney, Agent, or Firm*—Alston & Bird LLP

(57) ABSTRACT

A disclosed method comprises scanning a radio-frequency identification (RFID) tag on a package to generate scanned data, and generating a handling instruction for the package based on the scanned data. The handling instruction can be executed to route the package to a tip position within a hub facility for directing the package to the next location along its route, and/or to pre-load the package in a vehicle for delivery to the package's final destination. Related systems and computer-readable media are also disclosed.

9 Claims, 12 Drawing Sheets

U.S. PATENT DOCUMENTS

| | | | |
|---|---|---|---|
| 5,168,444 | A | 12/1992 | Cukor et al. |
| 5,557,096 | A | 9/1996 | Watanabe et al. |
| 5,684,705 | A | 11/1997 | Herbert |
| 5,770,841 | A | 6/1998 | Moed et al. |
| 5,793,035 | A | 8/1998 | Turner et al. |
| 5,793,305 | A * | 8/1998 | Turner et al. ............. 340/10.34 |
| 5,861,817 | A | 1/1999 | Palmer et al. |
| 5,869,819 | A | 2/1999 | Knowles et al. |
| 5,880,451 | A | 3/1999 | Smith et al. |
| 5,893,464 | A * | 4/1999 | Kiani et al. ................. 209/584 |
| 5,971,587 | A * | 10/1999 | Kato et al. ................... 700/115 |
| 6,005,211 | A * | 12/1999 | Huang et al. ................ 209/583 |
| 6,218,942 | B1 | 4/2001 | Vega et al. |
| 6,230,872 | B1 | 5/2001 | Huang et al. |
| 6,394,354 | B1 | 5/2002 | Wilz et al. |
| 6,401,078 | B1 | 6/2002 | Roberts et al. |
| 6,484,886 | B1 | 11/2002 | Isaacs et al. |
| 6,557,758 | B1 | 5/2003 | Monico |
| 6,598,783 | B2 | 7/2003 | Brinkman |
| 6,680,452 | B2 | 1/2004 | Takizawa |
| 6,704,690 | B2 | 3/2004 | Koh et al. |
| 6,721,617 | B2 | 4/2004 | Kato et al. |
| 6,736,600 | B1 | 5/2004 | Takizawa |
| 6,826,446 | B1 | 11/2004 | Volta |
| 6,853,294 | B1 * | 2/2005 | Ramamurthy et al. ...... 340/10.1 |
| 6,941,278 | B2 | 9/2005 | Soga et al. |
| 6,988,079 | B1 | 1/2006 | Or-Bach et al. |
| 7,034,683 | B2 | 4/2006 | Ghazarian |
| 7,063,256 | B2 * | 6/2006 | Anderson et al. ........... 235/385 |
| 7,118,034 | B2 * | 10/2006 | Baldassari et al. .......... 235/383 |
| 7,221,276 | B2 * | 5/2007 | Olsen et al. .............. 340/572.1 |
| 7,278,568 | B2 * | 10/2007 | Kadaba ....................... 235/375 |
| 7,306,147 | B2 * | 12/2007 | Baldassari et al. .......... 235/384 |
| 7,309,000 | B2 * | 12/2007 | McDonald ................... 235/375 |
| 7,357,317 | B2 * | 4/2008 | Baldassari et al. .......... 235/383 |
| 2002/0038261 | A1 | 3/2002 | Kargman et al. |
| 2002/0103728 | A1 | 8/2002 | Naghshineh et al. |
| 2002/0145042 | A1 * | 10/2002 | Knowles et al. ........ 235/462.01 |
| 2002/0175112 | A1 | 11/2002 | Takizawa |
| 2002/0185358 | A1 | 12/2002 | Zeitler et al. |
| 2003/0014143 | A1 * | 1/2003 | Kato et al. ................... 700/115 |
| 2003/0038065 | A1 | 2/2003 | Pippin et al. |
| 2003/0101069 | A1 | 5/2003 | Sando |
| 2003/0101148 | A1 | 5/2003 | Montgomery et al. |
| 2003/0106771 | A1 | 6/2003 | Takizawa |
| 2003/0116480 | A1 | 6/2003 | Takizawa |
| 2003/0116481 | A1 | 6/2003 | Takizawa |
| 2003/0116484 | A1 | 6/2003 | Takizawa |
| 2003/0164401 | A1 | 9/2003 | Andreasson et al. |
| 2003/0227392 | A1 * | 12/2003 | Ebert et al. ............. 340/825.49 |
| 2004/0004119 | A1 * | 1/2004 | Baldassari et al. .......... 235/384 |
| 2004/0049315 | A1 | 3/2004 | Sansone et al. |
| 2004/0069849 | A1 * | 4/2004 | Stevens et al. .............. 235/385 |
| 2004/0093222 | A1 | 5/2004 | Sipe et al. |
| 2004/0098272 | A1 | 5/2004 | Kapsis et al. |
| 2004/0111339 | A1 | 6/2004 | Wehrung et al. |
| 2004/0143354 | A1 | 7/2004 | Kato et al. |
| 2004/0149826 | A1 | 8/2004 | Alleshouse |
| 2004/0153208 | A1 | 8/2004 | Wilke |
| 2004/0176872 | A1 * | 9/2004 | Eidemiller .................. 700/225 |
| 2004/0193449 | A1 | 9/2004 | Wildman et al. |
| 2004/0215588 | A1 | 10/2004 | Cornelius |
| 2004/0257203 | A1 | 12/2004 | Maltsev et al. |
| 2005/0004882 | A1 | 1/2005 | Teichgraber et al. |
| 2005/0038758 | A1 | 2/2005 | Hilbush et al. |
| 2005/0099292 | A1 | 5/2005 | Sajkawsky |
| 2005/0116034 | A1 | 6/2005 | Satake et al. |
| 2005/0189271 | A1 | 9/2005 | Ceruitti et al. |
| 2005/0216119 | A1 * | 9/2005 | Hamilton .................... 700/224 |
| 2005/0217972 | A1 | 10/2005 | Haan et al. |
| 2005/0252596 | A1 * | 11/2005 | Olsen et al. ................... 156/64 |
| 2006/0022824 | A1 * | 2/2006 | Olsen et al. .............. 340/572.1 |
| 2006/0071072 | A1 | 4/2006 | McDonald .................. 235/385 |
| 2006/0273167 | A1 * | 12/2006 | Baldassari et al. .......... 235/385 |
| 2007/0000989 | A1 * | 1/2007 | Kadaba ....................... 235/375 |
| 2007/0000990 | A1 * | 1/2007 | Baldassari et al. .......... 235/375 |
| 2007/0012602 | A1 * | 1/2007 | Baldassari et al. .......... 209/583 |
| 2007/0126578 | A1 * | 6/2007 | Broussard ................ 340/572.1 |
| 2008/0179225 | A1 * | 7/2008 | Bowers et al. .............. 209/584 |
| 2008/0230449 | A1 * | 9/2008 | Stemmle ..................... 209/584 |
| 2008/0264834 | A1 * | 10/2008 | Olsen et al. ................. 209/547 |

FOREIGN PATENT DOCUMENTS

| | | |
|---|---|---|
| EP | 00424728 A | 5/1991 |
| EP | 1211658 A2 | 6/2002 |
| EP | 1189163 | 3/2003 |
| JP | 11/504856 | 5/1999 |
| JP | 11-296581 | 10/1999 |
| JP | 2000/509655 | 8/2000 |
| JP | 2001/205199 | 7/2001 |
| JP | 2001-225926 | 8/2001 |
| JP | 2001/512042 | 8/2001 |
| JP | 2002-169879 | 6/2002 |
| NL | 8501150 A | 11/1986 |
| WO | 9600685 | 1/1996 |
| WO | 0046726 | 8/2000 |
| WO | 0126047 A1 | 4/2001 |
| WO | 0132322 | 5/2001 |
| WO | 0208942 | 1/2002 |
| WO | WO0208942 | 1/2002 |
| WO | 02057030 A1 | 7/2002 |

OTHER PUBLICATIONS

Notice of Allowance and Fees Due dated Apr. 5, 2007.

Accenture. Radio Frequency Identification White Paper [online], Nov. 16, 2001[retrieved on Nov. 30, 2002]. Retrieved from the Internet: <URL: http://www.accenture.com/xdoc/en/services/technology/vision/RFIDWhitePaperNov01.pdf>.

Boushka, Richard, Haffey. The Value of Auto-ID Technologies in Transportation [online], Nov. 1, 2002 [retrieved on Mar. 4, 2003]. Retrieved from the Internet: [URL: http://www.accenture.com/xdoc/en/services/technology/vision/Auto-ID_Freight.pdf] p. 1-23.

Woods. Supply Chain RFID Is Tractical Now, But Will Be Strategic. Research Note, Markets [online], Apr. 9, 2002, [retrieved on Sep. 5, 2003]. Retrieved from the database of Gartner, Inc. using Internet <URL: http://www3.gartner.com/Init> with Note No. M-15-7736.

Magrassi. Why A Universal RFID Infrastructure Would Be A Good Thing. Research Note, Technology [online], May 2, 2002, [retrieved on Sep. 5, 2003]. Retrieved from the database of Gartner, Inc. using Internet <URL: http://www3.gartner.com/Init> with Note No. T-16-0038.

Magrassi,. Why A Universal RFID Infrastructure May Never Exist. Research Note, Strategic Planning, May 2, 2002, [retrieved on Sep. 5, 2003]. Retrieved from the database of Gartner, Inc. using Internet <URL: http://www3.gartner.com/Init> with Note No. SPA-16-0061.

International Search Report from corresponding International Application No. PCT/US03/15299 dated Sep. 23, 2003.

Notice of Allowance and Fees Due dated Aug. 14, 2007 for U.S. Appl. No. 11/465,032.

Translation of Official Action dated Jul. 20, 2007.

* cited by examiner

| 3000 | 4000 | 2000 | 1000 |
|------|------|------|------|
| 3999 | 4999 | 2999 | 1999 |
| 7000 | 8000 | 6000 | 5000 |
| 7999 | 8999 | 6999 | 5999 |

R019

| 3000 | 4000 | 2000 | 1000 |
|------|------|------|------|
| 3999 | 4999 | 2999 | 1999 |
| 7000 | 8000 | 6000 | 5000 |
| 7999 | 8999 | 6999 | 5999 |

R020

| 3000 | 4000 | 2000 | 1000 |
|------|------|------|------|
| 3999 | 4999 | 2999 | 1999 |
| 7000 | 8000 | 6000 | 5000 |
| 7999 | 8999 | 6999 | 5999 |

R021

Pri: Blue  Sec: Yellow  Irg: A22  10:30

R021-5889

The Joseph Wilkes Doe Company, Inc.
1228 Main Street
Suite 55
Floor 2
Townintheusofamerica, MD 21309-1234
(Comment Field          EOF)

SLIC: 1234 LP: 12A
RTE: POLITO.R
12/28/1999 05:59
DCAP: AD1
PRT: 001

```
COUNTRY LN

HARTSVILLE SC 29550

P: DARL        S: 0069           I: OUT 45E-6630                          [D]
1Z123456789012 3454

BOS HIP PRINTER   Feb  22  05:15:02  2002
US  2950  HIP  1.10  ELT2543
```

```
COUNTRY LN

MC BEE SC 29101

P:             S:                I:

ESC-2950                          [ ]
1Z123456789012 3454

BOS HIP PRINTER   Feb  22  05:15:02  2002
US  2950  HIP  1.10  ELT2543
```

SYSTEMS AND METHODS FOR PACKAGE SORTATION AND DELIVERY USING RADIO FREQUENCY IDENTIFICATION TECHNOLOGY

CROSS-REFERENCE TO RELATED APPLICATIONS

This divisional patent application claiming the benefits of U.S. nonprovisional application Ser. No. 10/439,672 filed May 16, 2003 now U.S. Pat. No. 7,118,034 pursuant to Title 35, United States Code §§ 100 et seq. and 37 C.F.R. Section 1.53(b) claiming priority under Title 35, United States Code § 119(e) to U.S. provisional application No. 60/381,485 filed May 16, 2002. All the subject applications have been or are under obligation to be assigned to the same entity.

FIELD OF THE INVENTION

The present invention relates to the use of radio frequency identification technology in package sortation and delivery systems.

BACKGROUND OF THE INVENTION

Barcodes are well known in the package delivery industry as a method of identifying and tracking packages. The barcode is a binary code consisting of a field of bars and gaps arranged in a parallel configuration. The bars and gaps are arranged according to a given pattern that corresponds to some data. The configuration of the bars and gaps reflect a pattern when illuminated by a laser scanner. The optical power received by the scanner can then be processed and the data associated with the configuration extracted. Thus, in the case of barcode reading, transmission of data is performed optically.

In the context of a package delivery system, packages bearing barcodes are scanned at various points in a carrier system and the data captured from the barcodes are used to route the package through the system. In addition, the information captured from the barcode may be uploaded to a package tracking database and made available to shippers and consignees that wish to track the progress of a package through the carrier system. However, there are several limitations with using barcodes to perform these functions. For one, the process of scanning a barcode requires a direct line of sight between the reader and the barcode. Even in automated carrier sortation facilities, packages must be manually placed on the sortation conveyor belts so that the barcode of the package shipping label will be properly aligned for the scanning process. Another problem is that the barcode becomes unreadable if the code is obscured or if the package label bearing the code is damaged in the shipping process.

A need therefore exists in the industry for an improved method of capturing package information that overcomes deficiencies in the prior art, some of which are discussed above.

BRIEF SUMMARY OF THE INVENTION

The described hereinabove, and achieve numerous advantages not disclosed methods and systems, in their various embodiments, overcome the disadvantages previously possible.

According to one embodiment, a disclosed method comprises scanning a radio-frequency identification (RFID) tag on a package to generate scanned data, and generating a handling instruction for the package based on the scanned data. The scanning can be performed by conveying the package on a belt passed an RFID interrogator that generates scanned data by scanning the RFID tag. The handling instruction can be executed to sort the package for delivery to a sort location in a hub facility to direct the package to the next location along the route to its final destination. Alternatively, the handling instruction can be executed to pre-load the package on a vehicle for delivery to the package's final destination. The scanned data can comprise an RFID identifier to permit a hub control system to retrieve corresponding package information to route the package to its destination. Alternatively, the scanned data can itself comprise package information data identifying the destination of the package. The package can be scanned at more than one location along its route to generate package tracking data that can be stored in a database to notify a shipper, consignee or addressee, and possibly others involved with the package shipment of the package's status and/or to assign work resources to route the package to its destination.

The disclosure is also directed to related systems and computer-readable media.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 illustrates how a pre-load assist label is used to load a package onto a package car in accordance with an embodiment of the present invention.

FIG. 10 shows to pre-load assist labels in accordance with an embodiment of the present invention.

DETAILED DESCRIPTION OF THE INVENTION

Figure 1:
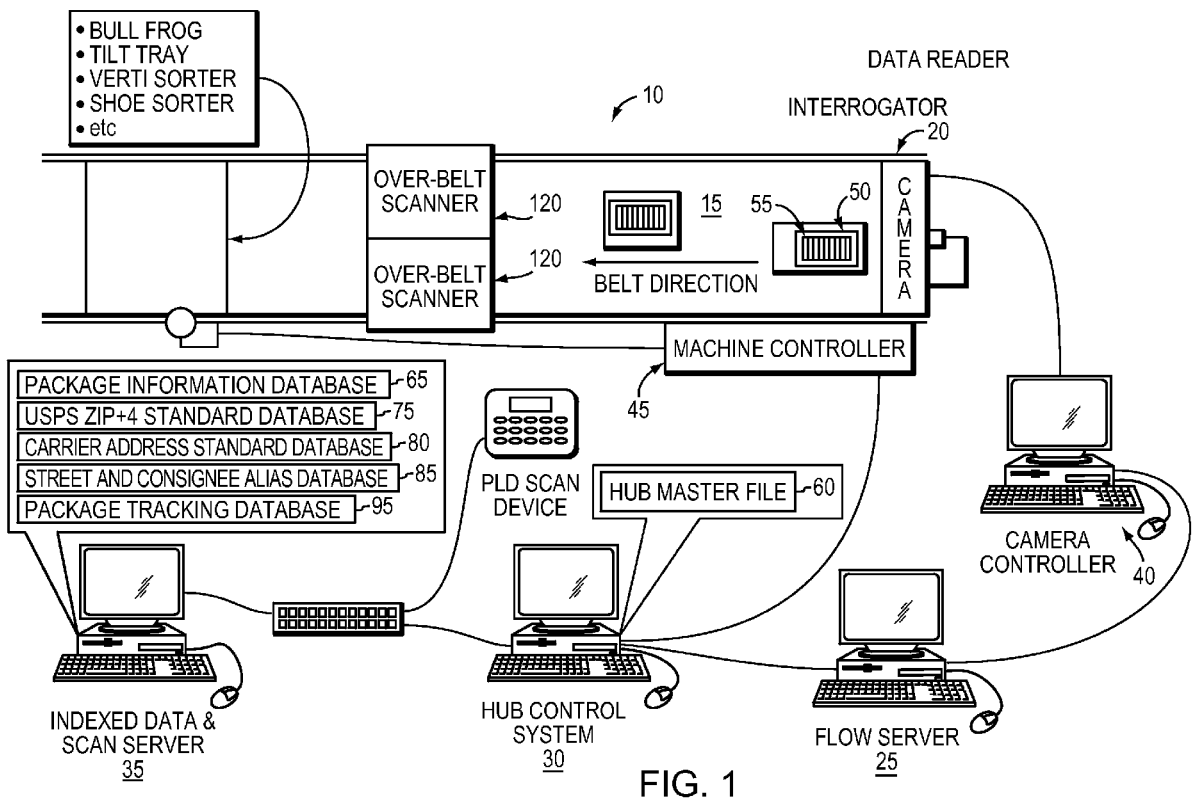
FIG. 1 illustrates a package sortation system that employs RFID technology to capture package information in accordance with an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

A. Radio Frequency Identification Technology

A technology known as radio frequency identification technology (RFID) uses radio waves rather than optics to capture and transmit data. RFID is basically a form of labeling where electronic labels or tags are programmed with unique information and attached to objects to be identified or tracked. In RFID electronic chips are used to store data that can be broadcast via radio waves to a reader, eliminating the need for a direct line of sight and making it possible for tags to be placed anywhere on or in a package. Additional benefits of RFID are the greater data storage capacity of the RFID tag in comparison to the barcode and the decreased likelihood that the RFID tag will be destroyed or otherwise made unreadable.

A typical RFID system consists of a reader, a tag and a data processing system to process the data read from the tag. The tag also is called a transponder, an expression which is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be fulfilled. In general, a reader has radio circuitry to communicate with a tag, a microprocessor to check and decode the data and implement a protocol, a memory to store data and one or more antennas to receive the signal.

Unlike a barcode reader, which is limited to reading a single barcode at a time, a RFID reader may have more than one tag in its interrogation zone. The interrogation zone, as that term is used herein, refers to the area covered by the magnetic field generated by the reader's antenna. The process of reading a number of transponders within a system's interrogation zone is known as batch reading. Software applications known as anticollision algorithms exist that permit a reader to avoid data collision from several tags that enter the interrogation zone at the same time. One of three different anticollision techniques is generally implemented; these techniques are spatial, frequency and time domain procedures.

In the spatial domain technique, the reader restricts its interrogation zone in order to reduce the possibility that two different transponders fall into the area covered by the reader itself. With this technique, the number of readers needed to cover an area increases in proportion to the size of the covered area. Frequency domain procedures are based on frequency domain multiplex techniques or spread spectrum technologies. In these systems, the reader broadcasts a status of frequencies allocated to the communication with the transponders, with frequencies flagged that are currently in use by a transponder. When a new transponder accesses the reader's coverage, it uses an unoccupied frequency to transmit its data.

Time domain anticollision techniques are divided into two categories: interrogator and transponder driven procedures. In addition, interrogator driven time domain anticollision procedures can be sub-divided into polling and binary search procedures. Polling techniques make use of the fact that a unique serial number is written to each transponder at the production stage. In the polling technique, the interrogator requests all possible transponder serial numbers until a transponder with a polled serial number responds. The polling procedure is typically slow and generally is limited to processes employing small numbers of transponders. The other interrogator driven procedure is the binary search. A binary search is faster than the polling technique, and is based on search algorithms that use binary trees of transponder identifiers. In the transponder driven anticollision procedures, the transponder, rather than the interrogator, controls the data flow. In general, transponder driven procedures are based on the cyclic transmission of identifiers by transponders and are designed such that it is unlikely that any two transponders will send the same identifier at the same time.

B. Use of RFID Technology in a Carrier Hub Sortation

The following paragraphs describe novel methods and systems wherein RFID technology is used in connection with a package sortation and delivery system. FIG. 1 illustrates a package sortation system 10 that employs RFID technology to capture package information. In this embodiment, the sortation system 10 includes a conveyor belt 15, an interrogator 20, a flow server 25, a hub control system 30, an indexed data server 35, a camera controller 40 and a machine controller 45.

The package sortation system 10 described herein may be used in a carrier hub facility or as part of a pre-load sortation system. A carrier hub facility is typically an interim facility where packages are sorted for shipment to other carrier facilities in route to their ultimate destinations. In contrast, packages that pass through a pre-load sortation system are sorted onto package cars and delivered to their final destination. Although the following paragraphs describe this embodiment of the package sortation system 10 in the context of a carrier hub facility, one of ordinary skill in the art will readily recognize that this embodiment is equally advantageous in the pre-load sortation context, or in any other package sortation operation.

Packages arrive at a carrier hub facility and are placed on a conveyor belt 15, which takes the packages to the package sortation system 15. Each package is equipped with a RFID package tag 50 that may be part of or separate from the shipping label on the package. In a preferred embodiment, the RFID package tag 50 has a unique alphanumeric character string (herein referred to as a RFID identifier 55) that identifies the package. Packages may be individually placed on the conveyor belt 15 or may be grouped together in a package container. Because the package tag communicates via a radio signal, the orientation of the package on the conveyor belt is irrelevant. Whereas in a barcode sortation system a person must manually align the packages onto the conveyor belt 15 in preparation for a scanning process, in the present invention movement of packages onto the conveyor belt 15 may be automated.

As a package moves on the conveyor belt 15 to the sortation system 10, an interrogator 20 reads the RFID package tag 50 and captures an RFID identifier 55 associated with the package. RFID package tags 50 may be active or passive depending on whether they have an on-board power source or not. In general, active tags use batteries to power the tag transmitter (radio) and receiver. These tags usually contain a greater number of components than do passive tags. Therefore, active tags are usually larger in size and are more expensive than passive tags. In addition, the life of an active tag is directly related to battery life. In contrast, a passive tag reflects the RF signal transmitted to it from a reader and adds information by modulating the reflected signal. A passive tag does not use a battery to boost the energy of the reflected signal. But a passive tag may use a battery to maintain memory in the tag or power the electronics that enable the tag to modulate the reflected signal.

A benefit of using RFID technology to capture a package identifier is the speed at which the package tag 50 can be read. Whereas it can take as long as two to three seconds to scan a barcode by hand, a RFID package tag 50 can be read in approximately twenty-five milliseconds. As a result, the present invention allows the conveyor belt 15 to be set at a higher speed and packages are processed by the sortation system 10 in less time.

When the interrogator 20 reads the RFID package tag 50, the package RFID identifier 55 is captured and sent to the flow server 25, which, in turn, passes the package identifier 55 to the hub control system 30. In a preferred embodiment, the hub control system 30 is a system that controls the movement of packages through the carrier hub facility. A carrier hub facility generally contains multiple conveyors that move packages to various tip positions within the building, and the hub control system 30 is aware of every location within the facility. The term tip position is known in the art and refers to a location in a carrier hub facility in which packages bound for a particular destination are tipped off a conveyor belt and prepared for transit to that destination. Thus, for example, a hub control system 30 may recognize that packages that are bound for Atlanta, Ga. need to be sorted to tip position 1, whereas packages bound for Los Angeles, Calif. should be sent to tip position 49.

At the start of a package sort, the hub control system 30 retrieves a hub master file 60 associated with the hub facility and maps the information from the hub master file 60 to the sortation and tip positions for the hub facility. In a preferred embodiment, the data in the hub master file 60 determines the path that will be used to move packages through the hub facility to their next destination. The hub control system 30 contacts the hub master file 60 and downloads every possible carrier hub facility that might be the next destination of a package involved in the package sort. The hub control system 30 then maps each potential package destination to a unique tip position in the hub facility. As packages are received, the hub control system 30 uses the hub master file 60 to determine the next hub facility destination for the package. The hub control system 30 then determines which location within the building (i.e. which tip position) to sort the package to so that the package will be routed to the proper hub facility. And finally, the hub control system 30 determines the sortation path through the building so that the package will be sorted to the proper tip location.

Returning to FIG. 1, if the package information received by the hub control system 30 includes the destination zip code and service level for the package, the hub control system 30 issues a hub handling instruction for the package. In one embodiment, the RFID identifier 55 captured by the interrogator and passed to the hub control system 30 includes sufficient information to generate a hub handling instruction. In an alternative embodiment, the RFID identifier 55 does not contain sufficient package information to allow the hub control system 30 to assign a hub handling instruction and the identifier 55 is forwarded on to the indexed data server 35.

If the hub control system 30 cannot generate a hub handling instruction, the RFID identifier 55 is sent to the indexed data server 35 and used as an index into a package information database 65. The package information database 65 contains detailed information about some or all of the packages in the carrier system. This information may originate with shippers that electronically upload the shipping detail for the packages placed in the carrier system. Alternatively, a carrier service provider may have picked up the package from the shipper and entered the package information. Still another possibility is that another carrier application and/or operator captured the package detail information as part of an earlier package sort and uploaded the information to the package information database 65. Additional information about the capture, storage and access of package level detailed information is set forth in International Application No. WO 00/46726, which is hereby incorporated by reference.

In a preferred embodiment, before the first call is made to the package information database 65, the package address data in the database is validated (or scrubbed) against one or more address databases in an address management system 70. In one embodiment, the address management system 70 validates package level detail information against three databases, including a United States Postal Service (USPS) zip+4 standard database 75, a carrier address standard database 80 and a street and consignee alias database 85. The USPS zip+4 standard database 75 includes all of the zip+4 addresses known to and maintained by the USPS. The carrier address standard database 80 includes those addresses known to the carrier that are not known to the USPS. In many cases, the addresses in the carrier address database are addresses of individuals who live in rural areas where mail is delivered to a post office box rather than to a physical address.

The third address database used to validate the package level detail data is referred to herein as a street and consignee alias database 75. In a preferred embodiment, the street and consignee alias database 75 includes alias information that the carrier has created based on historical delivery information. A "street alias" as that term is used herein is a commonly-used name for a street or an address that is different from the street address found in either the USPS or carrier address databases. For example, the USPS address standard for a particular street may be Route 45. But Route 45 may be commonly referred to as York Street by the people that live or do business on the street and, in fact, York Street may be the street name that is listed on street signs in the area. Thus, it is not uncommon for packages that are sent to Route 45 to bear the name York Street. Using an address management system interface 90, a user may create an alias entry in the street and consignee aliases database 85 so that when the address management system 70 receives a reference to York Street, the system 70 will treat the address as a valid reference to Route 45.

A "consignee alias," as that term is used herein, refers to a commonly used consignee name, which is associated with a particular address. As an example, assume a popular restaurant bears the name Jack & Jill's Sandwich Shop and is located at 10 Main Street, Baltimore, Md. 20093. In the USPS zip+4 address database 75 the only valid address for this location may be 10 Main Street, Baltimore, Md. 20093. In a preferred embodiment, carriers generally store address ranges rather than individual addresses; therefore, the carrier may recognize 10 Main Street through 99 Main Street as valid addresses for Baltimore, Md. 20093. However, in the package delivery industry it is not uncommon for packages to be addressed to a popular consignee name. In this example, then, a carrier might receive a package addressed to Jack & Jill's Sandwich Shop, Baltimore, Md. 20093 or, alternatively addressed as Jack & Jill's, Maryland 20093. By using in the address management GUI, a carrier can create a consignee alias that associates either of these shorthand addresses to the standard address for the restaurant. Thus, when the address management system 70 receives either of these non-standard references to the address for Jack & Jill's Sandwich Shop, the system 70 will treat the shorthand reference as a valid address.

Following the validation of the address data in the package information database 65 the package sort begins. If the hub control system 30 cannot assign a hub handling instruction to the package, the RFID identifier 55 is passed to the indexed data server 35 and used to search the now-validated package information database 65 to determine if a record of the package exists. If the package information database 65 has package detail data for the package, the service level and destination address are returned to the hub control system 30 and a hub handling instruction is assigned.

But if the package information database 65 does not have a record of the package, then package sortation system 10 relies on key-entry to capture the package information. In one embodiment, an operator stands near the conveyor belt 15 and manually retrieves any packages that are not assigned a hub handling instruction. The operator physically reviews the shipping label of the package and key enters the package service level and destination address. In a preferred embodiment the key-entered information is sent to the flow server 25, which passes the key-entered address to the address management system 70 to be validated. If a valid address has been key-entered, a hub handling instruction is generated based on the package address and service level. If the shipping label is unreadable and/or if no valid address can be key-entered from the package shipping label, the package is identified as an exception and set aside for special handling.

In an alternative embodiment, the package sortation system 10 includes a camera collector 40 that captures an image of every package that passes through the system 10. If neither the indexed data server 35 nor the hub control system 30 are able to assign a hub handling instruction to the package, the image of the package is sent to a telecode operator who attempts to key enter the package information shown on the image. A typical telecoding operation is described in greater detail in U.S. Pat. No. 5,770,841 to Moed, which is hereby incorporated by reference. Because this embodiment requires a package label to be scanned, the package may need to be oriented in such a way that the camera controller 40 can capture an image of the label. As before, if the key-entered package information is valid, the hub control system 30 generates the appropriate hub handling instruction. But if the operator cannot obtain an address from the package or if the address entered is invalid, the package is flagged for exception handling.

In a preferred embodiment, the camera controller 40 captures an image of every package that passes through the sortation system 10 and the images that are unused are discarded. Alternatively, the camera controller 40 captures only those images of packages that are not automatically assigned a hub handling instruction.

When the hub control system 30 assigns a hub handling instruction to a package, the hub handling instruction is sent to the machine controller 45. In a preferred embodiment, the machine controller 45 implements the hub handling instruction. Machine controllers 45 are known in the art. In general, the package sortation system 10 uses conventional systems, including belt optical encoders, to track the position of packages as they move through the hub. The systems used to track and direct the movement of packages through a hub facility are known in the art. Information about the use of tilt trays in a sortation system is available in U.S. Pat. Nos. 5,433,311 and 5,489,017, both issued to Bonnet and both of which are herein incorporated by reference. U.S. Pat. No. 6,005,211 to Huang and U.S. Pat. No. 5,547,063 to Bonnet also discuss the use of the sorter in the hub, and these patents too are hereby incorporated by reference.

In an alternative embodiment, the package sortation system 10 uses a series of RFID interrogators to continuously track packages as they move on conveyor belts 15 through the hub facility. In this embodiment, the machine controller 45 receives package location information from these readers and directs packages to their respective tip positions by controlling the speed and motion of the various conveyor belts 15. Thus, when the machine controller 45 receives a handling instruction that identifies the appropriate tip position for a package, the machine controller 45 sends commands to the belt conveyors 15 in the hub facility to divert the package to the identified tip position.

In a preferred embodiment, when the machine controller 45 has sorted a package to a tip position specified in a hub handling instruction, the controller 45 updates the indexed database server 35 to reflect the new location of the package. The package information database 65 is thus updated with the latest package location information. In addition, the indexed data server 35 updates an accessible, for example via the Internet, package tracking database 95 so that the shipper, consignee or other persons tracking the package can determine updated status information as the package is sorted through the hub facility and routed to the next stop in the carrier system. If desired, such persons may receive status notification, for example by email, at any point in the handling of the package.

Figure 2:
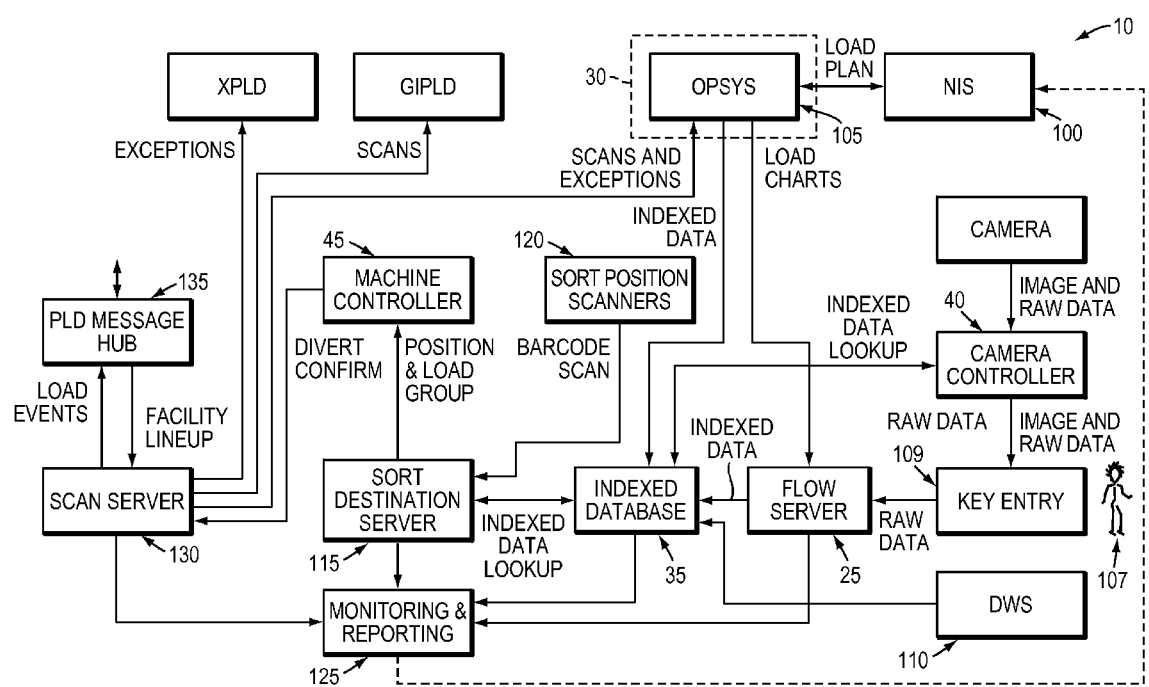
FIG. 2 is another view of a package sortation system in accordance with an embodiment of the present invention.

FIG. 2 is another view Of the package sortation system 10 that shows the data flow between some of the applications that are used in a package sort. At the start of the sort, a network information system (NIS) 100 sends a load plan to an hub operating application 105. The load plan is the file that controls the movement of packages through the carrier system in route to their ultimate destinations. Thus, for example, if a package is shipped from Chicago to Florida, the load plan generated by NIS 100 determines which carrier facilities between Chicago and Florida will be used to route the package. Load plans such as described herein are known in the art.

The hub operating application 105 controls the movement of packages within the hub facility, and is configured to receive the load plan from the NIS 100 and map the sortation positions in the hub facility to the package destinations established by the load plan. The hub operating application 105 also performs a manifest operation that requires the application 105 to track the location of every package in the hub facility. As packages are sorted for shipment to other carrier facilities, the hub operating application 105 notifies the other facilities which packages are inbound and approximates when the packages will arrive. If packages are misrouted or otherwise depart from their delivery schedules, the hub operating application 105 handles the rescheduling and re-forecasting of the packages. Thus, if a package destined to a carrier site is delayed, the hub operating application 105 reschedules the package and notifies the carrier site of the delay and new forecasted time of arrival.

In a preferred embodiment, the hub operating application 105 is part of the hub control system 30 and communicates with the indexed database server 35 and the flow server 25. As described above, the flow server 25 receives the RFID identifier 55 captured from the package and passes the information to the hub control system 30 and/or the indexed database server 35 in an effort to assign a hub handling instruction to the package. If neither the hub control system 30 nor the index database server 35 can assign a hub handling instruction to a package, the flow server 25 retrieves an image of the package label from the camera controller 40 and sends the image to an operator 107 at key-entry unit 109. And the operator key-enters the package address shown on the shipping label unit 109 transmits via unit 109 after the key-entered address data to the flow server 25.

In a preferred embodiment, the package sortation system 10 also includes a dimensional weighing system (DWS) 110. The DWS 110 is a device that weighs and measures packages as they travel along the conveyor belt 15. The weight and size of a package can be relevant to the sortation process as the weight and/or size of a package may affect the hub handling instruction assigned to the package. For example, a conveyor in a hub facility may not be able to handle packages over a specified weight, or a particular package container may not be able to hold packages that exceed a threshold size. Thus, in a preferred embodiment, the DWS 110 sends the weight and size of packages to the indexed database server 35 so that the appropriate hub handling instruction is generated for heavy and/or oversized packages. Additional information about dimensional weighing is available in U.S. Pat. No. 5,672,815 to Prutu, U.S. Pat. No. 5,340,950 to Smith, U.S. Pat. No. 5,408,054 to Smith and U.S. Pat. No. 5,908,283 to Huang, each of which is hereby incorporated by reference.

Those of ordinary skill in the art will appreciate that other kinds of data may be used for sorting packages. For example, such data can include data indicating whether the package is subject to duty or tariff, the value of the package contents, special handling instructions, and possibly other data. This data can be scanned directly from an RFID tag associated with the package using the interrogator and/or can be retrieved from one or more databases based on data scanned from the RFID tag.

In a preferred embodiment, the indexed database server 35 also communicates with a sort destination server 115 and one or more sort position scanners 120. In general, these are scanners and/or RFID tag readers that are placed farther down the conveyor belt 15 from the interrogator 20. In a preferred embodiment, these devices keep track of the location of packages so that the machine controller 45 can determine when to move or tip the package to another sortation area. The sort destination server 115 also serves as an interface between the machine controller 45 and the indexed database server 35. In a preferred embodiment, the sort destination server 115 accesses the indexed data server 35 and determines the tip position for a package, and then passes the tip position to the machine controller 45. The sort destination server 115 also stores the building configuration for the hub facility and, in a preferred embodiment provides for real-time manual and automated adjustments to the facility line-up.

The monitoring and reporting component 125 of the package sortation system 10 monitors the progress of the package sort. In a preferred embodiment, the monitoring and reporting component 125 monitors and reports all aspects of the package sort, including without limitation, total package volume sorted, package volume sorted by tip position, packages sent to exception handling and packages requiring key-entry. In addition, at the end of the sort, the monitoring and reporting component 125 passes the package sortation data back to the NIS 100, which uses the information in creating future load plans.

In a preferred embodiment, the machine controller 45 communicates with a scan server and/or an RFID interrogator server 130 to monitor and direct the movement of packages through the hub facility. As packages are sorted and moved from one conveyor to another, conventional systems track the movement of the packages. In another embodiment, RFID interrogators scan packages in the system and communicate the package locations to the machine controller 45, and the machine controller 45 uses the package location information to direct the movement of the package to the tip position indicated by the hub handling instruction. In a preferred embodiment, the RFID interrogator/scan server 130 also receives the divert information from the machine control systems and controls the movement of the package though the hub.

As packages are sorted to their respective tip positions, data about the package sortation is passed to one or more carrier databases for various purposes, including without limitation: package tracking, volume forecasting and load handling. In a preferred embodiment, a package level detail hub 135 uploads data to carrier systems and thereby serves as an interface between the package sortation system 10 and the carrier databases. As packages move through the hub facility, the package level detail hub 135 receives package sortation data from the scan/RFID interrogator server 130 and uploads the data to the various carrier databases.

C. Use of RFID Technology in a Package Pre-Load System

In the package delivery context, the pre-load process is an important stage in the delivery system. The packages have arrived at a carrier destination facility and pre-loaders are responsible for loading packages onto package cars for delivery to their ultimate destinations. A carrier destination facility generally has multiple package cars that are being loaded simultaneously and each package car is equipped with multiple package storage locations.

Pre-loaders have the responsibility of ensuring that packages are loaded on the correct storage location of the correct package car. To date, this has been a highly manual process requiring an extensive knowledge base on the part of the pre-loaders. Pre-loaders manually examine the destination address on the package shipping label and determine from memory, or with the aid of rudimentary load charts, which package car delivers to that address and which shelf on the package car is the appropriate storage spot for that package. The complexities associated with the pre-load process require that a pre-loader receive extensive training on how to properly load packages. In some cases, pre-load training lasts six or more weeks for each pre-loader, with additional time spent supervising recently trained pre-loaders. And notwithstanding the extensive training, the highly manual and knowledge-based nature of the process often results in errors in the pre-load process.

Another problem with pre-load systems that are known in the art is the reliance on the knowledge base of employees to perform a pre-load. As discussed above, much of the task of pre-loading relies on the ability of the pre-loader to look at the destination address of a package and remember where that package should be loaded. Whenever a dispatch plan changes, the pre-load plan also changes and the pre-loaders are required to learn the new load locations for each of the destinations. As a result, any changes to a dispatch plan that will impact the pre-load must be carefully considered as it requires a change in the pre-loaders' knowledge base and can negatively impact the package load operation.

Figure 3:
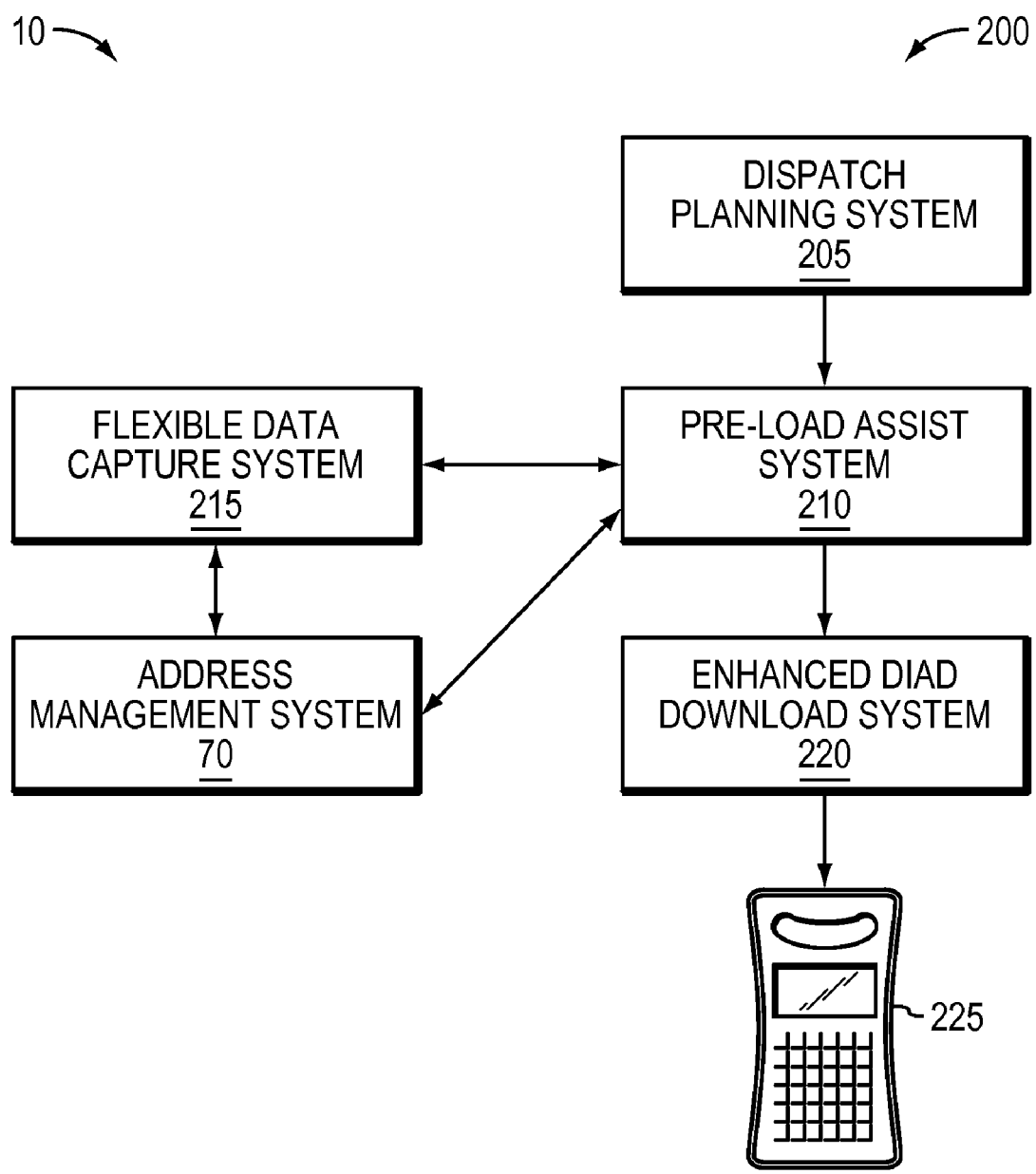
FIG. 3 illustrates a package sortation system as a component of a package pre-load system in accordance with an embodiment of the present invention.

FIG. 3 illustrates an embodiment of a package sortation system 10 in the context of a package pre-load system 200. The package sortation system 10 of FIG. 3 includes several components, including a dispatch planning system 205, a pre-load assist system 210, a flexible data capture system 215, an address management system 70, an enhanced delivery information acquisition device (DIAD) download system 220, and a DIAD unit 225. Each of these systems is described in greater detail below.

A function of the dispatch planning system 205 is to generate and schedule one or more dispatch plans that directs the sequence in which service providers pick up and deliver packages in a designated geographical area. Dispatch plans are well known in the art and are used daily by package carriers such as the United Parcel Services (UPS). At a high level, a dispatch plan is a method of separating a geographical area or territory into one or more service provider routes (delivery routes) and for each delivery route describing a service sequence for the addresses in the route.

In a preferred embodiment, the dispatch plan published by the dispatch planning system 205 includes a sequence of address ranges and an associated pre-load handling instruction for each sequence and service level combination. As described below, the pre-load handling instruction identifies a load and a load position in a service provider vehicle. The dispatch plan information is published to the pre-load assist system 210 component of the system 10 at the start of the pre-load process. The pre-load assist system 210, in turn, passes the address information from the dispatch plan to an address management system 70 to insure that the package address validation routine includes every address included in the dispatch plan.

As packages are received, the flexible data capture system 215 captures the service level and destination address from the shipping label on the packages. As described below, the data capture may occur automatically via a RFID tag interrogation process, or it may require user intervention and key-entry of the package data. The address information is then validated in the address management system 70 against an address standard, and the package address and service level information is forwarded to the pre-load assist system 210.

In one embodiment, the pre-load assist system 210 matches the package address and service level against the dispatch plan information and returns a pre-load handling instruction. In an alternative embodiment, the address management system 70 handles the matching of the package address to the dispatch plan and passes an index to the matched dispatch plan record to the pre-load assist system 210, which, in turn, returns the pre-load handling instruction.

The pre-load assist system 210 then formats the pre-load handling instruction and sends the information to the flexible data capture system 215 where a pre-load assist label (PAL) is printed and affixed to the package. The flexible data capture system 215 handles the printing of the PAL and the pre-load assist system 210 provides the pre-load handling instructions that make up the PAL. In a preferred embodiment, the pre-load assist system 210 provides the flexible data capture system 215 with all of the information necessary to print the PAL. One of ordinary skill in the art will readily recognize that a PAL could be printed by the pre-load assist system 210 or, alternatively, that a PAL image may be generated by the pre-load assist system 210 and transmitted to the flexible data capture system 215 for printing.

In a preferred embodiment, the pre-load handling instruction that is printed on the PAL identifies the package car on which the package will be loaded and a specific shelf location within the package car. The pre-load operation is thus greatly simplified by generating pre-load handling instructions for each package in the pre-load process. The simplified presentation of pre-load handling instructions allows an inexperienced pre-loader to become productive almost immediately as the knowledge base necessary to perform the pre-load operation is reduced. Prior to the present invention, pre-loaders were required to memorize potentially hundreds of addresses to load a delivery vehicle. Using the process described above, a pre-loader can readily perform the pre-load operation relying largely on the information present on the PAL.

Figure 4:
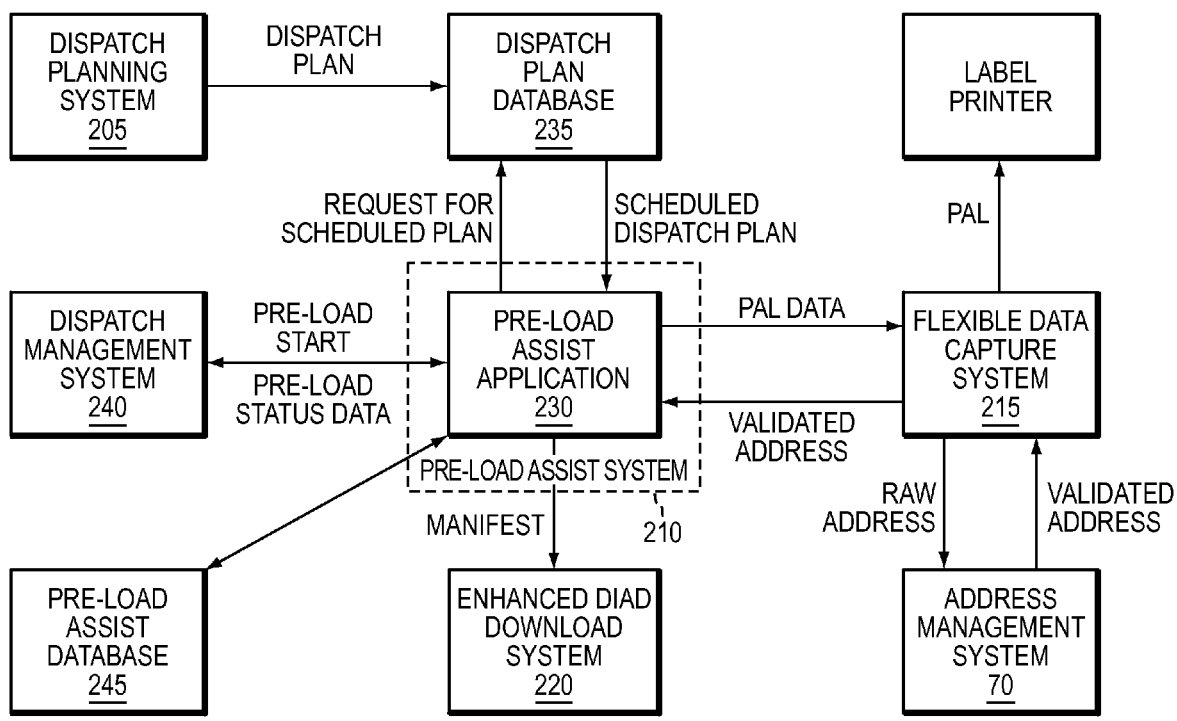
FIG. 4 illustrates a pre-load assist system in accordance with an embodiment of the present invention.

FIG. 4 illustrates a pre-load assist system 210 in accordance with an embodiment of the present invention. In this embodiment, a pre-load assist application 230 is in communication with a dispatch plan database 235, flexible data capture system 215, address management system 70, enhanced DIAD download system 220, a dispatch management system 240, and a pre-load assist database 245.

In a preferred embodiment, one or more dispatch plans are created by the dispatch planning system 205 and stored in a dispatch plan database 235. At the start of a pre-load, the pre-load assist application 230 retrieves the available dispatch plans from dispatch plans database 245 and sends them to the dispatch management system 240 where a user has the option of accepting the scheduled dispatch plan or choosing another dispatch plan on which to base the pre-load. The user at the dispatch management system 240 initiates the pre-load operation and the pre-load assist application 230 prepares the dispatch plan for the pre-load process.

As packages arrive in the pre-load area, the flexible data capture system 215 captures the destination addresses and service levels of the packages (using processes described below) and validates the address information using the address management system 70. A package service level and a valid destination address is passed to the pre-load assist application 230 and a match is made against the dispatch plan to obtain a pre-load handling instruction for the package. In an alternative embodiment, the matching of the package destination address against the dispatch plans is performed by the address management system 70 and the package service level and a dispatch plan index key is sent to the pre-load assist application 230 and used to generate the pre-load handling instructions.

The pre-load assist application 230 then passes the pre-load handling instruction information to the flexible data capture system 215 where the information is sent to a label printer and a pre-load assist label (PAL) is printed and affixed to the package.

FIG. 5 illustrates how a PAL is used to load a package onto a package car. An example of a PAL is shown at the lower left-hand corner of FIG. 5. In a preferred embodiment, the pre-load handling instructions of a PAL comprise two 4-character identifiers separated by a hyphen. The four characters on the left of the hyphen identify the route on which the package will be loaded, and the four characters to the right of the hyphen identify the load location on the package car. Subject to certain exceptions, a single package car is generally associated with a route. Thus, when a pre-loader sees the pre-load handling instructions on the PAL, the pre-loader immediately knows the package car and load position for the package. In this way, the pre-load handling instructions on the PAL eliminate the pre-loader reliance on a knowledge base of load positions and addresses, and allow a pre-loader to perform the pre-load task without extensive training.

In the example illustrated in FIG. 5, the pre-load handling instructions on the PAL instruct the pre-loader to load the package in position 5889 of route R021. With these pre-load handling instructions as a guide, the pre-loader identifies which of the three package cars is assigned to route R021 and loads the package in the shelf position that is associated with load positions 5000 through 5999. In a preferred embodiment, the load positions assigned to each package car are the same for all package cars. Alternatively, a service provider and/or pre-loader may customize the load position of a package car in such a way that the load position reflected on the PAL may identify different load positions, depending on the package car that is being loaded.

In a preferred embodiment, a PAL has additional package information, including primary and secondary package sortation information, irregular drop-off identifier, a DCAP station, a low to high indicator, a commit time, the destination address/consignee name, a package tracking number. The primary sort identifier identifies the primary sort belt that moves the package through the carrier facility and the secondary sort identifier identifies the secondary belt that moves the package from the primary belt to the belt where the package is loaded. The irregular drop-off identifier identifies the location in the building where the package will be placed if it is too large, too heavy or shaped such that it cannot be placed on a sorting belt. In general, packages bearing an irregular drop-off identifier are sorted manually. A DCAP station associates the package to a particular data capture workstation in the flexible data capture system 215. The low to high indicator indicates the order in which the package car should be loaded in the package car. In a preferred embodiment, if the low to high indicator is set, packages are loaded sequentially from the lowest number in the street range (i.e. 1 Main Street) to the highest number in the street range (i.e. 10 Main Street). If the low to high indicator is not set, the packages are loaded from the highest number (10 Main Street)

Figure 6:
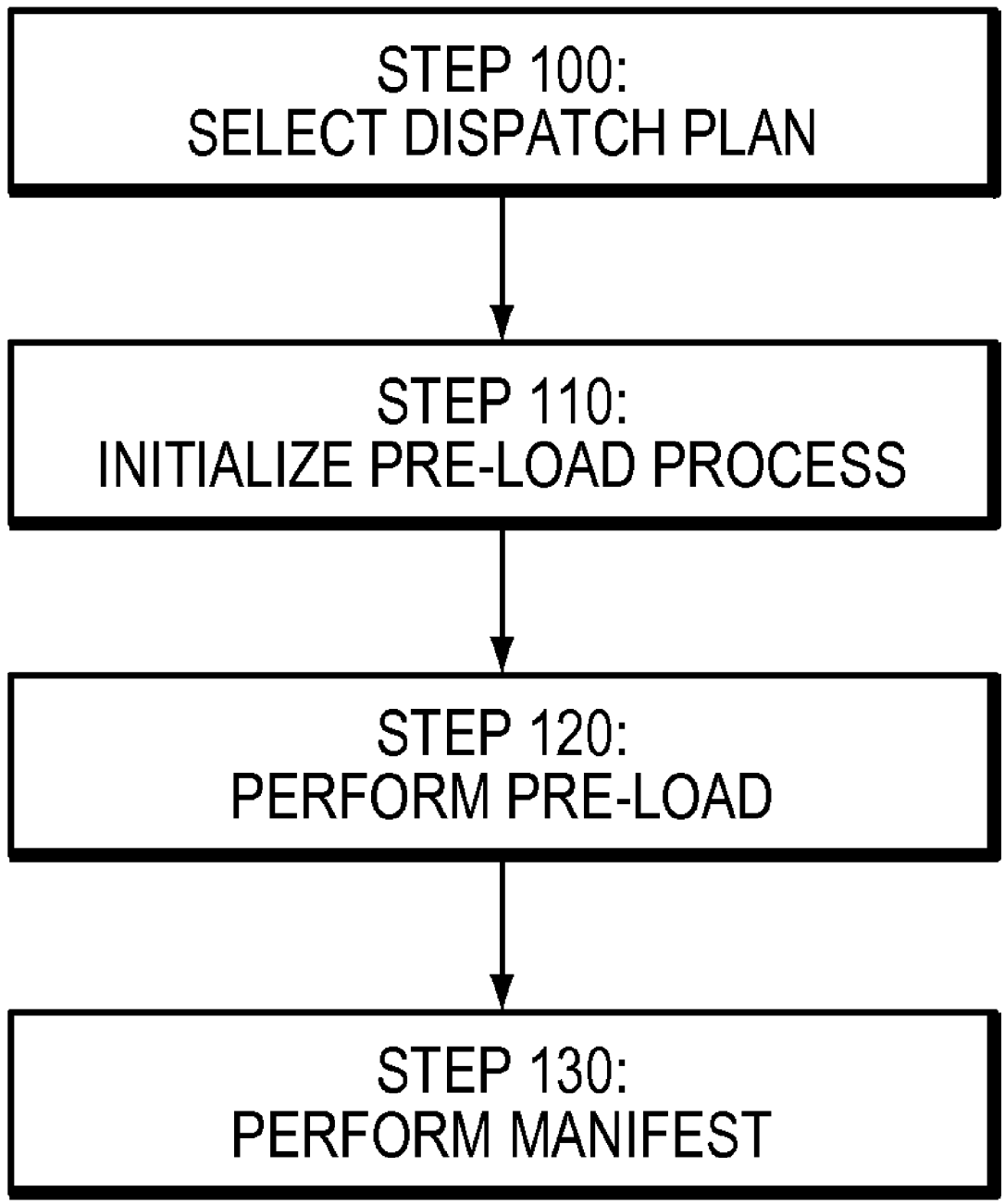
FIG. 6 is a process flow diagram that illustrates the steps of a pre-load process in accordance with an embodiment of the present invention.

FIG. 6 is a process flow diagram that illustrates the steps of a pre-load process in accordance with an embodiment of the present invention. The process starts at the beginning of the day when an operator selects which dispatch plan will be used to perform a pre-load (Step 100).

A. In Step 110 the pre-load assist application 230 prepares the selected dispatch plan for the real-time operation of the pre-load process. In Step 120 the pre-load operation begins. The flexible data capture system 215 begins capturing package information and sending it to the pre-load assist application 90, which assigns pre-load handling instructions to the packages. Once a pre-load handling instruction is generated and a PAL affixed to the package, in Step 130 the pre-load assist application 230 manifests the package.

Figure 7:
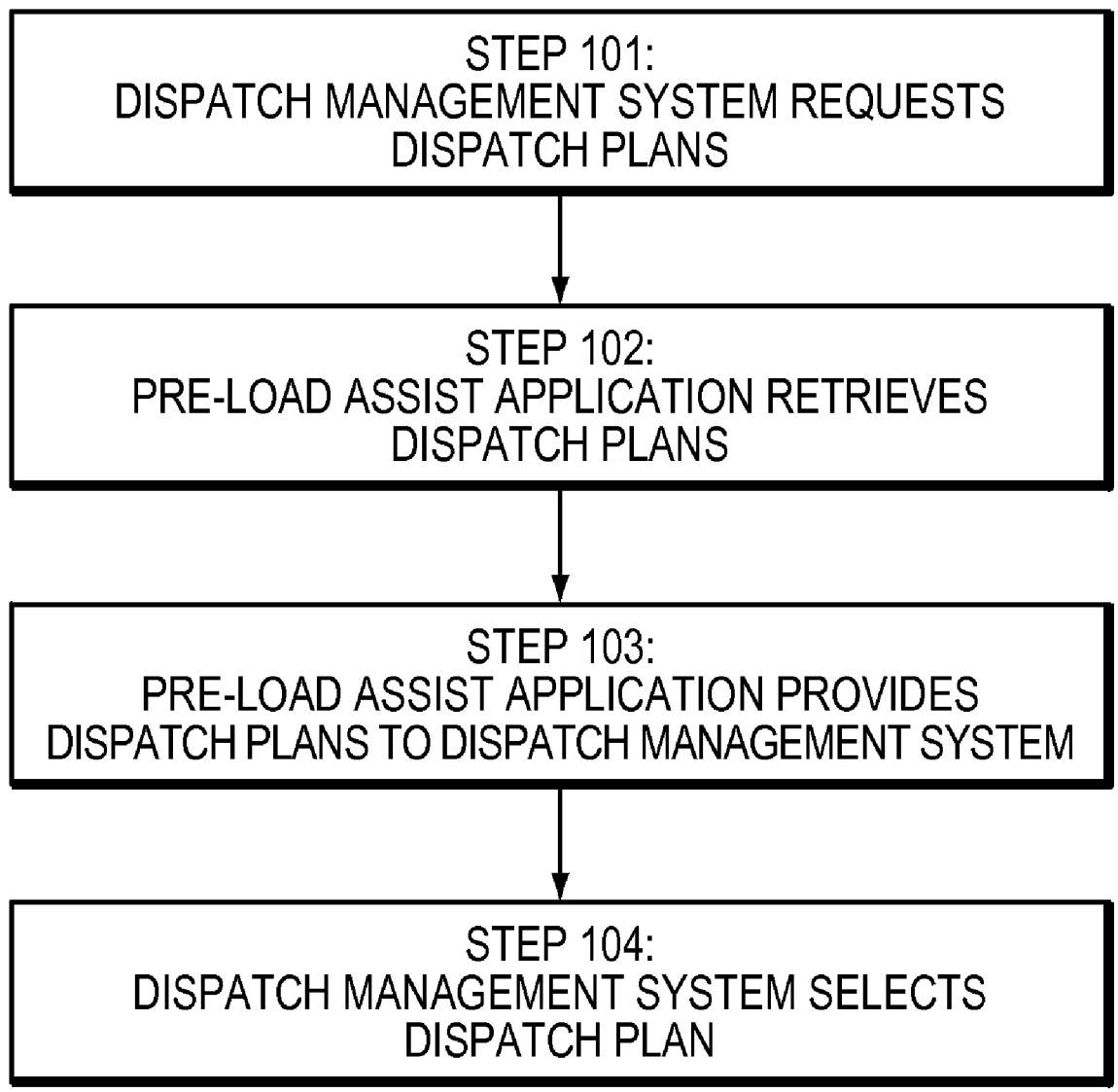
FIG. 7 is a process flow diagram that illustrates the steps of selecting a dispatch plan in accordance with an embodiment of the present invention.

FIG. 7 is a process flow diagram that illustrates the steps of selecting a dispatch plan in accordance with an embodiment of the present invention. In Step 101, a user requests the scheduled dispatch plan via the dispatch management system 240. The request is sent from the dispatch management system 240 to the pre-load assist application 230 and, in Step 102 the pre-load assist application 230 connects with the dispatch plan database 235 and requests the dispatch plan scheduled for that day. In Step 103, the pre-load assist application 230 passes the scheduled dispatch plan to the dispatch management system 240. In a preferred embodiment, the dispatch management system 240 has access to all available dispatch plans, with the scheduled dispatch plan marked as the default plan for the day. In Step 104, the dispatch management system 240 selects the dispatch plan that will be used for the pre-load process and the selected plan is sent to the pre-load assist application 230. The selection of the dispatch plan can be made by an operator using the dispatch management system 240.

In a preferred embodiment, a pre-load assist database 245 includes a cache of backup dispatch plans that are used for the pre-load operation in the event of a breakdown of the aforementioned process of retrieving a dispatch plan from the dispatch planning system 205.

Figure 8:
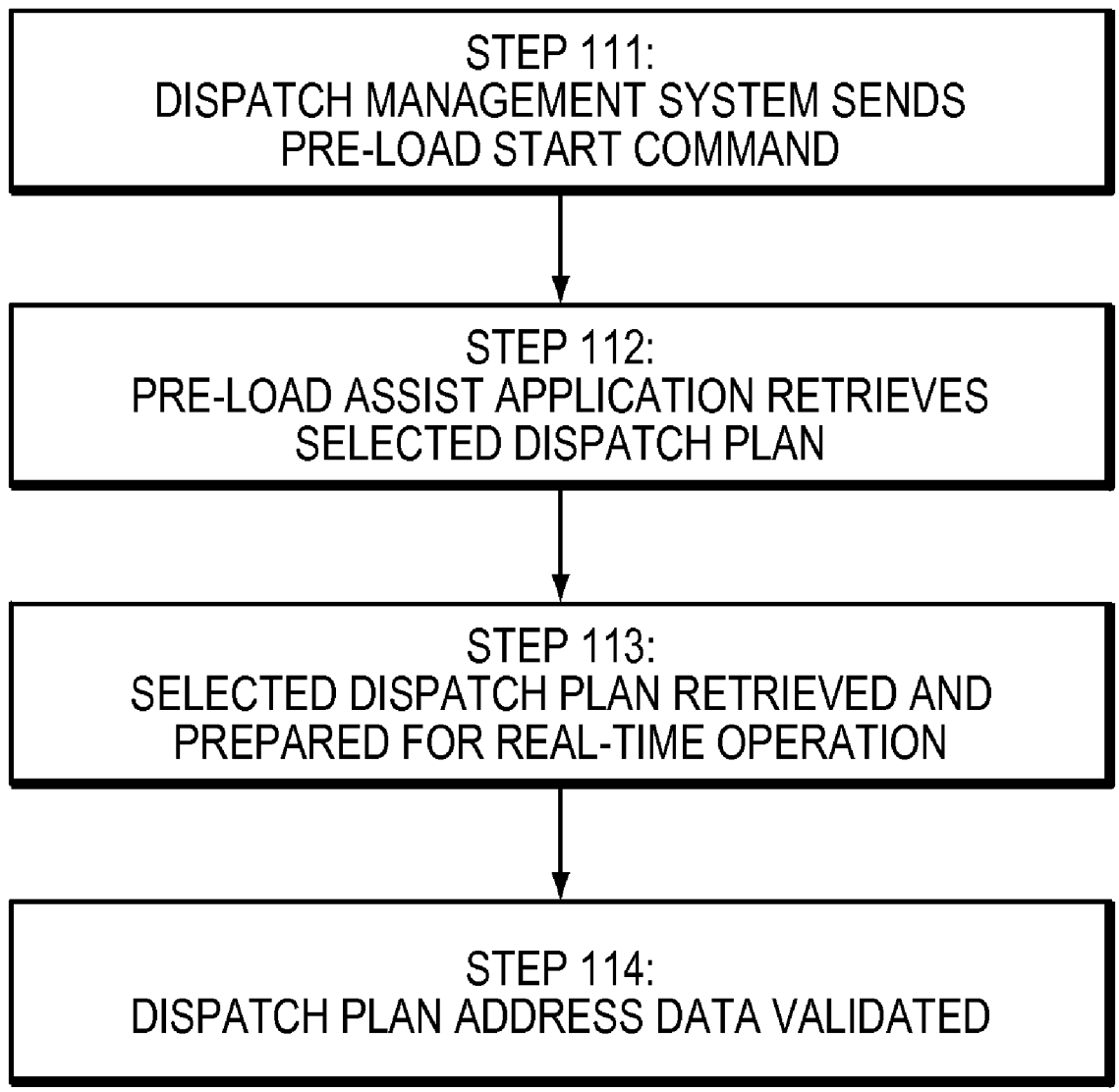
FIG. 8 is a process flow diagram that illustrates the steps of initializing a dispatch plan and readying the plan for real-time access in accordance with an embodiment of the present invention.

FIG. 8 is a process flow diagram that illustrates the steps of initializing a dispatch plan and readying the plan for real-time access in accordance with an embodiment of the present invention. In Step 111, the dispatch management system 240 sends an instruction to the pre-load assist application 230 to initialize the selected dispatch plan. In Step 112, the pre-load assist application 230 contacts the dispatch plan database 235 and identifies which dispatch plan will be used for the pre-load process. In Step 113, the selected dispatch plan is sent to the pre-load assist application 230 where it is decompressed for real-time access. In Step 114, the decompressed dispatch plan is sent to the address management system 70, where a check is performed to make sure that all of the addresses in the dispatch plan are recognized as valid in the address validation databases used by the address management system 70. In a preferred embodiment, the dispatch plan is decompressed and organized for real-time access/updates by the pre-load assist application 230 and stored in a pre-load assist database 245.

Figure 9:
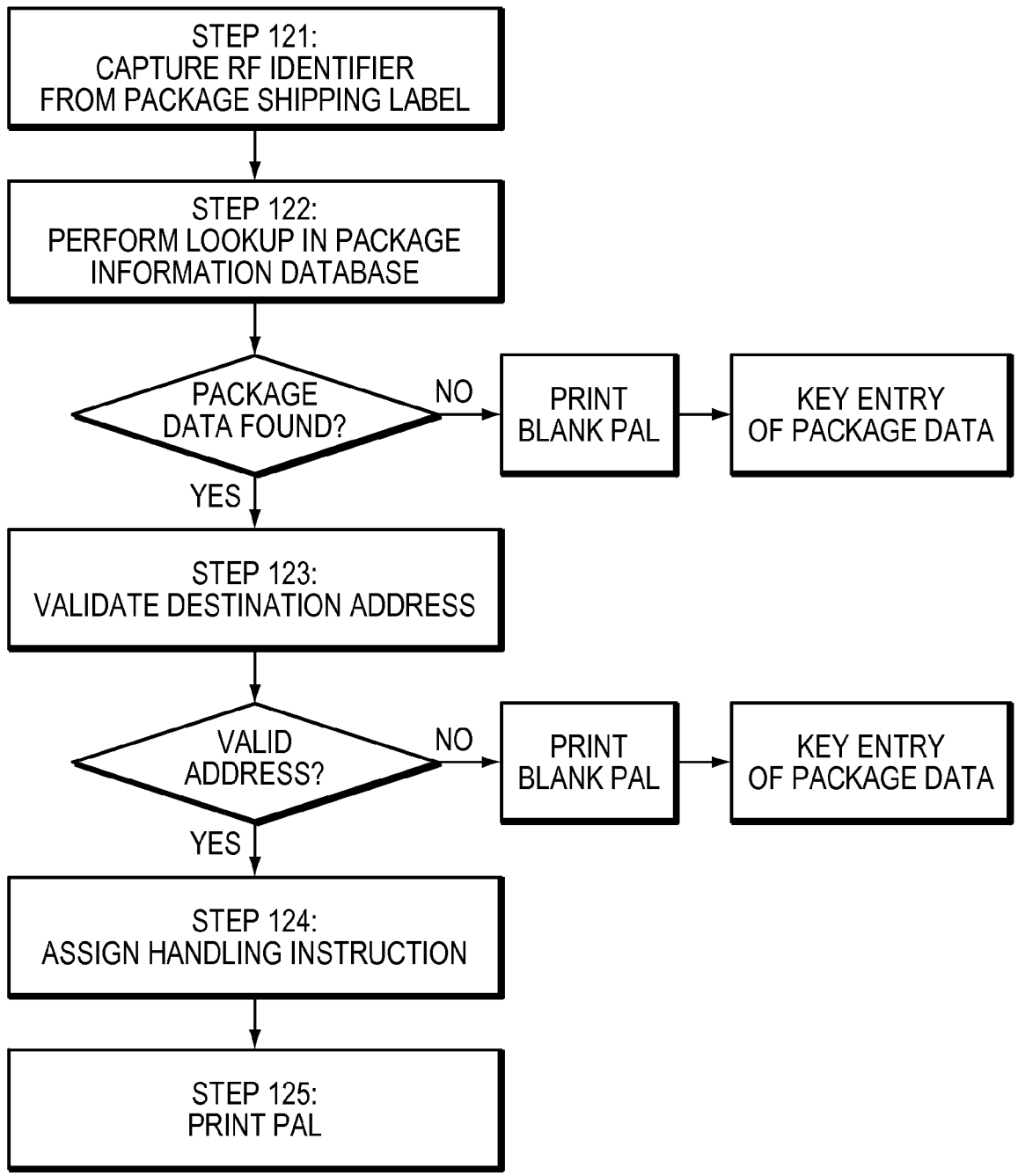
FIG. 9 is a process flow diagram that illustrates the steps of assigning pre-load handling instructions to packages in accordance with an embodiment of the present invention.

FIG. 9 is a process flow diagram that illustrates the steps of assigning pre-load handling instructions to packages in accordance with an embodiment of the present invention. The processes described below are sometimes referred to herein as the scan, print and apply (SPA) process, and the exception handling or exception capture process. The exception capture process applies to those packages that require key entry by a user to capture a valid destination address for the package.

In Step 121, an interrogator 20 reads a RFID package tag 50 and captures a RF Identifier 55. In Step 122, the flexible data capture system 215 uses the RF Identifier to perform a lookup in a package information database 65. If the package information database 65 has package detail information about the package, including the destination address and service level of the package, then the process proceeds to Step 123. If the package information database 65 does not have a record of the package the flexible data capture system 215 generates and affixes a blank PAL to the package. FIG. 10 shows two PALs in accordance with an embodiment of the present invention, including a completed PAL on the top and a blank PAL on the bottom.

In the flexible data capture system 215, key entry operators check packages that are headed to the pre-load area and if a package arrives with a blank PAL then the operator manually reviews the shipping label and attempts to key-enter a valid destination address for the package. If the operator is successful, a new PAL is generated and affixed to the package. If, however, the operator is unable to obtain a valid address for the package, the package is marked as an exception and sent to a special handling area where efforts additional efforts are made to obtain a valid destination address for the package.

Returning to FIG. 9, in Step 123 a package destination address is sent to the address management system 70 and the address is validated. If the address management system 70 determines that the destination address is a valid address, the process proceeds to Step 124 and the package detail information is sent from the flexible data capture system 215 to the pre-load assist application 210. If, however, the address management system 70 determines that the destination address is not a valid address, a blank PAL is generated and the package proceeds to the key-entry operators.

In Step 124, the pre-load assist application 230 matches the package destination address against the dispatch plan. When the package destination address is matched against an address range in the plan, the package is associated with a specific loop-sequence combination. This loop-sequence combination, in turn, is assigned to a particular route and to a particular load position in a package car. The pre-load assist application 230 also checks the service level of the package to determine whether the package is subject to a particular commit time. Thus, by comparing the destination address and service level of the package against the dispatch plan, the pre-load assist application 230 is able to generate pre-load handling instructions for the package. If the package destination does not match against the dispatch plan, a PAL is printed bearing a not in system identifier. Packages bearing a not in system identifier are loaded on package cars without the benefit of pre-load handling instructions.

In Step 125, the pre-load handling instructions are sent from the pre-load assist application 230 to the flexible data capture system 215, where a PAL is printed and affixed to the package.

Returning again to FIG. 6, once a pre-load handling instruction is generated and a PAL affixed to the package, in Step 130 the pre-load assist application 230 manifests the package. In a preferred embodiment, the process of manifesting a package means that the package is added to a particular load manifest. As described below, the load manifest is ultimately downloaded via the enhanced DIAD download system 220 to a DIAD unit 225 that a service provider carries on his or her route. The manifest in the DIAD unit 225 thus provides the service provider with a clear picture of the work to be completed. In addition, the process of manifesting allows the pre-load assist application 230 to monitor the amount of work allocated to each load.

The process of downloading the manifest to a DIAD unit 225 is discussed in greater detail below. In general, the pre-load assist application 230 stores the manifests for the pre-load in the pre-load assist database 245. When the pre-load assist application 230 receives a request to download a manifest to a DIAD unit 225, the pre-load assist application 230 retrieves the requested manifest from the pre-load assist database 245 and forwards the manifest to the enhanced DIAD download system 220.

As the pre-load proceeds, users can view the work allocated to each load in the pre-load through the dispatch management system 240. In a preferred embodiment, the dispatch management system 240 is a thin client in communication with the servers that control the pre-load process. Although users can affect the pre-load process through the dispatch management system 240, the dispatch management client generally does not perform pre-load processing. In general, multiple users can monitor the progress of the pre-load system through the dispatch management system 240.

Figure 11:
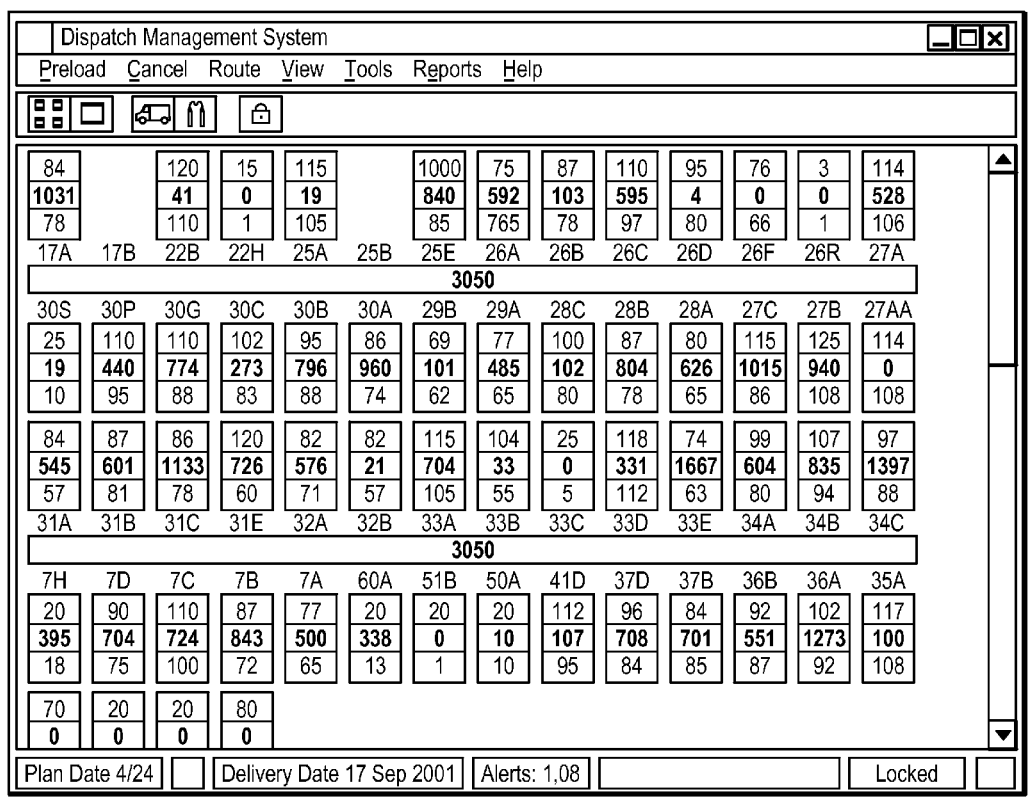
FIG. 11 is a screen shot from a dispatch management system that is monitoring a pre-load operation in accordance with an embodiment of the present invention.

FIG. 11 is a screen shot from a dispatch management system 240 that is monitoring a pre-load progress in real-time in accordance with an embodiment of the present invention. The dispatch management client display comprises rows of rectangular boxes. Each rectangular box represents a load and each box is sub-divided into three portions. In this embodiment, the number in the top portion of the rectangular box represents the maximum units of work that should be allocated to the load. In this screen shot, a unit of work is the number of delivery or pick up stops that has been allocated to the load. However, in a preferred embodiment, the dispatch management client allows the use to monitor different measures for units of work, including, for example, the number of packages added to the load. The number at the bottom portion of each rectangular box represents a minimum amount of work that should be allocated to the load. Thus, in a preferred embodiment, if the amount of work allocated to a load is less than this minimum threshold, work may be cut from other loads and added to this load. Finally, the number in the middle portion of the rectangular box is a running tally of the amount of work that has been added to the load. As the pre-load proceeds and additional work is added to the loads, the numbers in the middle portions are incremented.

In a preferred embodiment, each of the rectangular boxes in the dispatch management display is color-coded. At the start of a pre-load, the rectangular boxes are grayed-out. After the pre-load has continued for a predetermined time or reached some other predetermined threshold, the rectangular boxes with loads that have exceeded the maximum units of work turn red and the boxes with loads that have less than the minimum number of units of work turn yellow. Rectangular boxes for loads that have an amount of work allocated to the load that falls between the minimum and maximum thresholds remain gray. In this way, an operator can quickly glance at the display and determine which of the loads need adjustments or may need adjustments to their workloads.

In a preferred embodiment, the information used to calculate a stop is stored in the pre-load assist database 245, including stop information, adjustment factors, calculation methods for each address and commit window groups. In general, one package does not necessarily equate to one stop, nor does a single address necessarily equate to a single stop. For example, assume a shopping mall has a single address but ten retail stores at that address. Assume further that fifty packages are to be delivered at the mall. If the work calculation was based solely on the number of packages, the service provider would be credited for fifty stops even though the service provider is not required to travel between stops to service the fifty packages. If, on the other hand, the work measurement was based solely on the number of stops, the service provider would only be credited for a single stop despite the fact that 50 packages are to be delivered across ten retail stores. Thus, in a preferred embodiment, the work measurement used to calculate a stop involves a calculation method that is unique to each address and the various methods used to calculate work are stored in the pre-load assist database 245.

Multiple dispatch management systems 240 are setup in a service center and may be monitoring the pre-load progress at any given moment. In a preferred embodiment, the dispatch management systems 240, implemented as clients in this embodiment, have a subscription-based relationship with the pre-load assist application 230. In essence, when a user wants to use a dispatch management terminal to monitor the pre-load, the dispatch management terminal contacts the pre-load assist application 230 and registers itself. The pre-load assist application 230 continuously monitors the assignment of handling instructions, assignment of work loads, and manifesting of packages. At certain intervals, for example every thirty seconds or once a minute, the pre-load assist application 230 contacts one or more terminals of the dispatch management systems 240 that have registered with it and updates them with the new work measurement counts for each of the loads. One of ordinary skill in the art, however, will readily recognize that additional methods may be used to update the dispatch management terminals. In an alternative embodiment, for example, the dispatch management clients can be setup on a browser-type system that allows them to request a refresh of the pre-load data on command.

The following paragraphs describe the add/cut procedure in the pre-load assist system 230 in accordance with a preferred embodiment. As described above, the dispatch management system 240 provides visual indicators to users when a load has been allocated more than a maximum number of units of work. In such an event, the pre-load assist system 230 allows the user to request an add/cut through the dispatch management client. In a preferred embodiment, the actual add/cut processing is performed on the pre-load assist server; however, the request for the add/cut is initiated by the dispatch management system 240. In addition, the pre-load assist server can refuse the add/cut request. This occurs, for example, if two users working from different dispatch management systems 240 have requested an add/cut for the same load. When this occurs, the pre-load assist server accepts the first received request and refuses the later-received request.

In a preferred embodiment, the user of the dispatch management system 240 performs an add/cut by double clicking on a rectangular box that corresponds to a load. This changes the dispatch management system display and the user receives detailed information about the units of work that have been allocated to that load. In the case of a load that has too much work, two types of cuts are possible: a planned cut and an unplanned cut. As discussed above, a planned cut is part of the dispatch plan and reflects, for example, the dispatch plan designer's recognition that on certain days the workload for a particular service provider will be heavy. In such case, the dispatch plan already knows which work should be cut from the load and to which load or loads the work should be added. In a preferred embodiment, in the case of a planned cut, the user merely sends a request to the pre-load assist system to implement the cut as planned. Alternatively, the user may request an unplanned cut. Unplanned cuts occur when too much work is allocated to a particular load and the overload is not anticipated in the dispatch plan.

In a preferred embodiment, there are two methods of cutting work from an overworked load: to cut remaining packages or to cut current packages. In the case of a cut of current packages, work is removed from one load and distributed to one or more other loads. To perform this type of cut, the user uses the dispatch management system 240 to identify the work to be cut from the load and further identifies the destination of the work that is being cut. The user's add/cut instructions are then sent from the dispatch management system 240 to the pre-load assist system as a cut request. If the pre-load assist system grants the request and makes the desired cut/add changes, all of the registered dispatch management systems are updated with the change in load work volumes. In addition, add/cut instructions are printed, which the user gives to the affected pre-loaders who physically redistribute the packages from the overworked load to the new loads.

In contrast, when a remaining cut is requested by a user packages are not physically removed from one load and redistributed to other loads. Instead, the pre-load assist application 230 changes the pre-load handling instructions that will be used on incoming packages. Thus, packages that would normally be directed to the overworked load may be redirected to other loads as designated by the user that has performed the cut. In addition, in a preferred embodiment the PALs that are printed from the altered pre-load handling instruction will be flagged to indicate to the pre-loaders that a current cut has occurred. This prevents confusion in the event that the pre-loader recognizes the address on a package and knows that the dispatch plan originally planned to have the package sent to a different load.

In a preferred embodiment, the adds and cuts made to a pre-load are not reflected in the manifest stored in the pre-load assist database 245. In an alternative embodiment, however, the pre-load assist application 230 updates the manifest to reflect the planned and unplanned adds and cuts made during the pre-load operation. In still another embodiment, the pre-load assist database 245 stores a complete history of sort flow changes, including adds and cuts, and allows the user to undo changes that were made. Moreover, the pre-load assist database 245 includes an archive of past sorts, including the manifests and history of past sort flow changes.

The following paragraphs describe the enhanced DIAD download system 220 in accordance with an embodiment of the present invention. In a preferred embodiment, service providers carry a DIAD unit 225 with them as they service a route. DIAD units 225 are well known in the art and are used by UPS service providers in the package delivery environment. At present, the DIAD units 225 are used to collect information about the service provider delivery and pickup activities. At the end of the day, the service provider places the DIAD unit 225 in a rack and an application known as a DIAD control system 250 controls the upload of the information that was stored in the DIAD unit 225 throughout the day. Typically, some information about package pickups and deliveries is transmitted from the DIAD unit 225 to the carrier computer systems during the day. However, the upload that occurs at the end of the day provides a more detailed description of the work performed by the service provider.

Another function of the DIAD unit 225 that is well known in the industry is the ability to store address and consignee guidance information. Typically, at the start of the day the service provider picks up his or her DIAD unit 225 from the rack and the DIAD unit 225 has stored in it every potential address along that service provider's delivery route. As a driver delivers and picks up packages along the route, the driver enters the activity into the DIAD unit 225. Because the address guidance information has been uploaded to the DIAD unit 225, the service provider typically only needs to enter a few of the characters of the address and the DIAD unit 225 populates the rest of the address using the address guidance information. This limits the keystrokes that the service provider has to enter and lowers the number of typographical errors in entering address information. In addition, the consignee guidance information provides the service provider with any special customer-specific rules that may be needed to serve the customer.

A limitation of existing delivery systems that is recognized in the industry is the inability to provide a service provider with a clear picture of the work to be performed on a given day. While existing DIAD control systems are capable of uploading a list of every known address along a route, the DIAD units 225 do not tell the service provider which of those addresses are part of the delivery route for that day. At present, the only way that a service provider knows the work assigned to him or her on a given day is to physically search through the packages in the storage area of the package car. And this manual search often leads to delivery errors.

For example, assume a service provider expects to see all of the packages with an 8:30 AM commit time on the top side of shelf 1. Assume further that one of the packages with an 8:30 commit time was oversized and was loaded on the floor because it did not fit on the shelf. If the service provider does not notice the oversized package when he or she reviews the storage area, the package may not be discovered until after the commit time has passed. A need therefore exists in the industry for an improved system and method for providing service provider's with a manifest of the scheduled work for a route. Specifically, a need exists for a system that will download an electronic manifest of the work into the DIAD units 225 carried by service providers.

Figure 12:
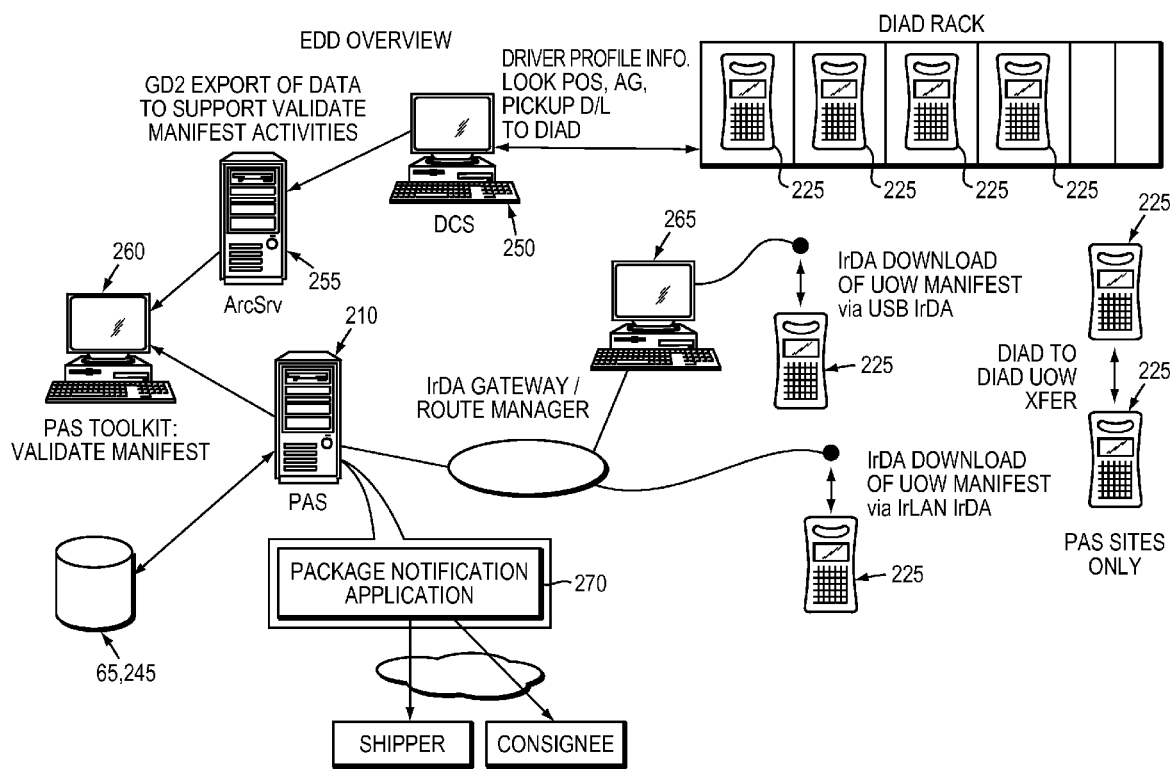
FIG. 12 illustrates an enhanced DIAD download system in accordance with an embodiment of the present invention.

FIG. 12 illustrates an enhanced DIAD download system 220 that will download a service provider manifest to a DIAD unit 225 in accordance with an embodiment of the present invention. In this embodiment, the enhanced DIAD download system 220 includes one or more DIAD units 225, a DIAD control system 250, a data archive server 255, a pre-load assist tool kit 260, and a route manager 265. In a preferred embodiment, the enhanced DIAD download system 220 is also in communication with the pre-load assist system 210, which, in turn, communicates with the package information database 65 and/or the pre-load assist database 245.

The DIAD control system 250 controls the upload and download of information from the DIAD units 225 while the units are stored in a rack. In a preferred embodiment, the DIAD control system 250 resides on a workstation in a service center and communicates with the DIAD units 225 via an optical communication interface. One of ordinary skill in the art however will readily recognize that other communication interfaces may be used instead of the optical interface, including infrared, cellular and/or wireless.

The data archive server 255 is another carrier server in communication with the DIAD control system 250 that receives information that has been downloaded from the DIAD units 225 at the end of day. As discussed below, among the information sent to the data archive server 255 is a disposition on all of the manifested packages, including information on the work performed that was listed on the manifest, the work performed that was missing from the manifest, and the work listed on the manifest that was not performed. This information is then passed from the data archive server 255 to the pre-load assist tool kit 260 where the disposition information is compared against the actual manifest. In a preferred embodiment, the comparison of the disposition data to the manifest provides a report card on the accuracy of the manifest information, the decisions made by the service provider during the day and the accuracy of the information received from customers.

The route manager 265 serves as an interface between the DIAD unit 225 and the pre-load assist system 210. In the embodiment illustrated in FIG. 12, the route manager 265 communicates with the DIAD units 225 directly via an IrDA interface or through another IrDA device connected to a local area network. The DIAD units 225 access the local area network via an IrDA device connected to a universal serial bus port of a personal computer or, alternatively, through an IrDA device connected directly to the network. One of ordinary skill in the art, however, will readily recognize that other methods of communication between the route manager 265 and DIAD units 225 are possible and can be equally advantageous with the present invention.

The following paragraphs describe the process of using the enhanced DIAD download system 220 to download a manifest to a DIAD unit 225 in accordance with an embodiment of the present invention.

At the start of the day, the service provider retrieves a DIAD unit 225 from a rack of DIADs and immediately before beginning a route connects the DIAD unit 225 to an IrDA device and downloads a manifest of the activities for the day. In an alternative embodiment, the manifest may be downloaded to the DIAD unit 225 prior to the service provider retrieving the DIAD unit 225 from the rack. The advantage to waiting to download the manifest until just before the route begins is that the most recent version of the manifest is downloaded. Thus, last minute additions or modifications to the load that occur after the service provider has retrieved the DIAD unit 225 from the rack may not be included in the manifest if the DIAD control system 250 assumes responsibility for the manifest download. In an alternative embodiment, the DIAD control system 250 downloads the manifest while the DIAD unit 225 is in the rack and a cellular or wireless data radio updates the DIAD unit 225 with any changes to the manifest.

In a preferred embodiment, the route manager 265 receives the request from the DIAD unit 225 for a manifest and forwards the request to the pre-load assist system 210. In a preferred embodiment, the pre-load assist system 210 retrieves the requested manifest from the package information database 65 and transmits the manifest information through the route manager 265 to the DIAD unit 225. In an alternative embodiment, the pre-load assist system 210 may store and retrieve the manifest information from a pre-load assist database 245 rather than the package information database 65. When the route manager 265 receives the manifest from the pre-load assist system 210, it downloads the manifest to the DIAD unit 225 and the manifest thus is made available to the service provider during the route. In a preferred embodiment, a service provider can update the manifest information as often as necessary. For example, if an add/cut is performed after the service provider has downloaded the manifest, the service provider can reconnect the DIAD unit 225 to an IrDA device to update the manifest with the add/cut information. Alternatively, the DIAD unit 225 is able to communicate via wireless, cellular or other communication methods known in the art and updates to the manifest are transmitted to the DIAD unit 225 after the service provider begins the route.

The DIAD unit 225 is programmed to perform a variety of functions using the manifest data, including, as a non-limiting example, work transfer, "determine next activity" and "perform activity" functions.

In the case of a work transfer, manifest information is passed between DIAD units 225. In a preferred embodiment, manifest information for one or more units of work is passed from one DIAD unit 225 to another DIAD unit 225 using the IrDA ports on the units. For example, if one service provider has fallen behind his or her delivery schedule, the service provider has the option of transferring some of the work to another service provider. If the work transferred involves packages that need to be delivered, the service providers will meet at a convenient location where the physical packages will be transferred from one package car to another. In a preferred embodiment, the service providers will be able to change the electronic packages as well. Thus, by allowing DIAD unit 225 to DIAD unit 225 communication, the work associated with the first service provider's manifest may be passed to the second service provider's manifest. As another example, if the work that is transferred does not require the physical exchange of packages, for example if the transfer work is a pick up at a particular location, the work associated with the pickup may be electronically exchanged between DIAD units 225 via a cellular, wireless, wide area network or other communication methods known in the art. Thus, two or more service providers can exchange units of work without being near each other.

Another benefit of having manifest information present in the DIAD units 225 is the "determine next activity" function. At present, a service provider is continuously moving in and out of the storage area of the package car as he or she proceeds along a delivery route, repeatedly reviewing the work that needs to be completed. And a service provider's failure to keep a close eye on the work often results in a missed commit time or the need to backtrack along the route to deliver a package that was missed. The "determine next activity" function of the DIAD unit 225 addresses this planning problem by tracking the manifested work and presenting the service provider with an ordered plan to complete the work.

In a preferred embodiment, a service provider can access the manifest data in several ways, including a whole view and a commit time view. When the whole view is used, the manifest is organized by commit and delivery order listing (DOL). DOL organizes work based on the sequence established by the dispatch plan without regard to premium service levels. The commit time takes into account that work with a premium service level must be completed on or before established commit times. The whole view of the manifest defaults to the DOL view of the manifest; however, work that has a commit time gains priority in the manifest list as the commit time approaches. In other words, the manifest display increases the priority of commit time work to notify the service provider that a commit time is approaching and the service provider needs to start considering the work for a future delivery.

In a preferred embodiment, the "determine next activity" function of the DIAD unit 225 controls the manner in which the manifest is organized in the display. As a particular commit time approaches, the work that must be completed by the approaching commit time is given higher precedence in the list of work. In one embodiment, if more than one package has the same commit time, the commit packages are sorted by DOL. In an alternative embodiment, the determine next activity function estimates the location of the service provider based upon the work remaining on the manifest and organizes the commit time work so that the manifest lists those commit time packages that are closest to the service provider's present position. In still another embodiment, the DIAD unit 225 is equipped with a global positioning system (GPS) and uses the GPS unit to determine the service provider position.

In a preferred embodiment, the service provider may also view the manifest using a commit time view. The commit time view lists only that work on the manifest that has a commit time and, in a preferred embodiment, the work is organized first by commit time and then by DOL. In alternative embodiments, the commit time work is organized first by commit time and then by the work that is closest to the service provider current location.

Still another benefit of having manifest information present in the DIAD units 225 is the perform activity function. In a preferred embodiment, the perform activity function is used when the service provider makes a delivery or picks up a package at a stop. Because the DIAD unit 225 already has the delivery information in electronic format, the delivery information is pre-populated on the DIAD unit 225 display and the service provider does not have to key enter the delivery information. In general, when a service provider makes a delivery he or she will scan a bar code on the package shipping label and the delivery information for the package will be pre-populated on the DIAD unit 225 display. In addition, the perform activity provides the service provider with accessorial data for that stop, including information such as whether an adult signature is required for the manifested work and/or whether the work is a cash-on-delivery transaction. One of ordinary skill in the art will readily understand that other types of accessorial information may be included in the manifest and made available to the service provider as part of the perform activity function.

In a preferred embodiment, as work is completed the work disappears from the manifest display. At the end of the day the manifest is cleared and the service provider returns the DIAD unit 225 to the DIAD rack. Disposition information collected throughout the day is then uploaded to the DIAD control system 250 and is passed to the data archive server 255 and pre-load assist tool kit 260. In a preferred embodiment, the pre-load assist tool kit 260 then compares the disposition information against the manifest, which provides feedback about the accuracy of the manifest process, the decisions made by the service provider and the accuracy of information received from the customers.

D. Package Notification through RFID Technology

The following paragraphs describe systems and methods that use RFID technology to identify a package and notify customers of an estimated time of arrival for inbound packages.

In a preferred embodiment, a pre-load assist system 210 performs the package notification function. As described above, a pre-load operation begins with the scheduling of a dispatch plan. At a high level, the dispatch plan is a file that has divided the territory for a service center into separate loops, and further sub-divided the loops into separate routes. Every potential address in a service provider route is identified in a dispatch plan and is assigned a sequence number. As the service provider performs the work assigned to a route, the address sequence in the dispatch plan determines the order in which the addresses in the route are serviced.

As packages are received in a pre-load system 200, an interrogator 20 in the flexible data capture system 215 reads the RFID package tags 50 associated with each package and captures a unique RFID identifier 55. In one embodiment, the RFID identifier 55 contains sufficient information about the package to allow a pre-load assist application 230 to match the package against the dispatch plan. In an alternative embodiment, the pre-load assist application 230 uses the RFID identifier 55 as an index into a package information database 65 to obtain the necessary package information. In either case, the package information made available by the RFID identifier 55 allows the pre-load assist application 230 to generate a pre-load handling instruction for the package.

Once the pre-load handling instruction is assigned to the package, the pre-load assist application 230 manifests the package. In a preferred embodiment, the process of manifesting a package means that the package is added to a particular load manifest. As additional packages are processed by the pre-load system 200, the load manifest for each load in the pre-load is updated. In a preferred embodiment, at the end of the pre-load the load manifests provide a complete picture of the work assigned to each service provider route. In addition, the sequence in which the work will be performed is also available in the dispatch plan.

At the completion of the pre-load operation, a package notification application 270 imports each of the load manifests generated in the pre-load operation. The notification application 270 compares the load manifests against the dispatch plan to determine the sequence in which the work associated with each load will be performed. In a preferred embodiment, the notification application 270 consults work measurement tables that provide estimates based on historical data of the time required to perform each unit of work. The notification application 270 then assigns work estimates to each task in a load manifest and, in this way, approximates the time of day when the service provider will perform each unit of work assigned to a given route.

Once the package notification application 270 has estimated the time at which each unit of work in each manifest will be completed, the application 270 determines which parties have requested inbound notification. In one embodiment, inbound package notification is tied to a particular package service level. In such case, the notification application 270 reviews the service levels for each unit of work in a manifest and identifies those that are associated with inbound notification. For each unit of work requiring a notification, the notification application 270 performs a lookup into the package information database 65 and retrieves the necessary contact information. Thus, if an email notification is associated with a particular service level the notification application 270 retrieves an email address for the person or entity that has been requested to receive the notification. Alternatively, if a facsimile notification is associated with another service level, the notification application 270 retrieves a facsimile number and the name of the person to receive the notification.

A request for notification may originate with either a shipper or a consignee. Further, when a shipper makes the request, the shipper may request that consignees receive notification of inbound packages and/or that the shipper be notified when packages are about to be delivered. The following paragraph describes the process wherein a shipper requests that his or her consignees be notified of incoming packages.

In a preferred embodiment, the package notification application 270 determines each of the packages from the pre-load for which the shipper has requested consignee notification and aggregates those packages that have the same shipper contact information. Thus, if a shipper has two packages in the same pre-load that are bound for the same consignee, the notification application 270 will send a single notification that identifies each of the packages and their respective anticipated times of arrival. This is true, even if the packages will be delivered via different service providers from different routes. As another example, if the shipper sends packages to two different consignees, each consignee can receive a separate notification that lists only the package associated with that consignee.

A similar aggregation can occur for consignees that request notification of inbound packages, even for inbound packages that have been shipped by different shippers. For example, assume that a retailer has requested notification for inbound packages, and assume further that in a particular pre-load three packages will be delivered to the retailer from shipper ABC and two packages will be delivered from shipper XYZ. In a preferred embodiment, the notification application 270 will aggregate the package notifications and provide the retailer with a single notification that identifies the five inbound packages, the shipper associated with each package and the anticipated arrival time of each package.

In a preferred embodiment, the notification application 270 is configured to provide notifications via email, facsimile, pager or automated messaging system. One of ordinary skill in the art, however, will readily recognize that other forms of communicating information about inbound packages are known in the art and may be used with the present invention.

E. Other Uses of RFID Technology in Package Delivery Systems

In another embodiment of the present invention, individual containers in a carrier system are tagged with a unique RFID identifier so that the use and location of the containers may be monitored over time. RFID tags on containers also allow monitoring of vehicle utilization. Alternatively, RFID tags can be affixed to the vehicles. From this utilization information, the carrier has sufficient information to make dynamic or real-time adjustments to carrier fleet sizes to maximize vehicle utilization. In a related embodiment, the utilization information allows the carrier to employ alternative financing, accounting, or charging methods responsive to the container and vehicle use patterns. Moreover, the ability to track container usage helps the carrier to prevent the loss or destruction of package containers by indicating where in the system the containers are stored and/or lost.

In another embodiment, the RFID tags on containers aid the carrier in volume planning. As described above, the package sortation systems in hubs allows the carrier to forecast where in the carrier system each package is headed. This ability will also allow the systems in one hub facility to notify downstream locations of inbound shipments. Thus allowing these locations to plan for the next stage in the sortation or delivery process based on actual package volumes. In a related embodiment, the sortation system and hub facilities can use the package information provided by RFID to notify pre-load systems of the inbound package volume in a pre-load. And, in a preferred embodiment, the pre-load system could determine from the notification the work volume assigned to each load in the pre-load. Accordingly, adjustments could be made to the dispatch plan or pre-load operation before the first package is ever pre-loaded.

In still another embodiment, electronic product codes (EPCs) may be added to packages. The use of EPC data coupled with RFID technology would thus allow the identification of the contents of the package. In one embodiment, a unique RFID package identifier that identifies the contents of a package would be used to aid in the processing of packages in customs by providing detailed customs information that would allow the package to be processed by customs without necessitating the opening and physical inspection of the package contents. Many government agencies, including customs, require information about the contents of the package. In a preferred embodiment, the EPC code of the package is added to the package information database and therefore is electronically available to carrier custom systems or other system that require package content information. Similarly, package content can be classified and package sortation and delivery process can be tailored to the content of the packages. Thus, for example, the sortation and delivery of hazardous or perishable merchandise differ from the processing used for other packages.

As previously described, the identification of packages by radio signal allows the sortation and movement of packages without requiring that packages be oriented on a conveyor belt. In another embodiment, packages move through a hub facility or other sortation system in a group, or even in a single container or vehicle, and an interrogator 20 is coupled to a data processing application configured to obtain and separate information from multiple RFID tags that enter the interrogation zone at the same time. In this way, the packages can be sorted and/or directed to the next downstream location without being physically removed from a container or separated from other packages. In another embodiment, a carrier vehicle or container carrying multiple packages may be scanned as the container or vehicle moves into or out of a hub or pre-load facility and the RFID tags of each package read and compared against a sortation plan to insure that packages have not been misloaded. The process of scanning individual packages just before moving them onto carrier vehicles is known in the art and discussed in U.S. Pat. No. 5,804,802 to Card, which is hereby incorporated by reference.

The package sortation methods and systems, which comprise an ordered listing of selectable services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

That which is claimed:

1. A method comprising:
    scanning, via a scanner, a radio-frequency identification (RFID) tag on a package to generate scanned data including a package identifier;
    transmitting the scanned data including the package identifier to a hub control system remote from the scanner;
    receiving the scanned data including the package identifier at the hub control system;
    in response to receiving the scanned data at the hub control system for which package information can be determined by the hub control system:
        (a) generating a handling instruction for the package by the hub control system, and
        (b) transmitting the handling instruction from the hub control system to machine controllers associated with conveyors and sorting devices along a sortation path,
    in response to receiving scanned data at the hub control system for which no package information can be determined by the hub control system:
        (a) transmitting the package identifier from the hub control system to an indexed data server,
        (b) receiving the package identifier at the indexed data server,
        (c) accessing, via the indexed data server, a package information database containing package information indicating destinations of packages identified by package identifiers,
        (d) transmitting at least a portion of the package identifiers and corresponding destinations to the hub control system,
        (e) generating a handling instruction for the package by the hub control system, and
        (f) transmitting the handling instruction from the hub control system to machine controllers associated with conveyors and sorting devices alone a sortation path, and
    updating a package tracking database based on the hub control system delivering the package to a tip position in a hub facility.

2. A method as claimed in claim 1 further comprising notifying an entity involved in the shipment of the package that the package has been delivered to the tip position.

3. A method as claimed in claim 2, wherein the entity is a shipper of the package.

4. A method as claimed in claim 2, wherein the entity is the addressee of the package.

5. A method as claimed in claim 2, wherein the entity is another hub facility.

6. A method as claimed in claim 1, wherein the handling instruction comprises a pre-load handling instruction for pre-loading the package into a delivery vehicle.

7. A method as claimed in claim 1, wherein the scanned data comprises package information data including an address, the method further comprising the step of validating the address using a street and consignee alias database of an address management system.

8. A method as claimed in claim 1, wherein the scanned data comprises package information data for which no valid address can be determined, the method further comprising the step of receiving key-entered data based on a shipping label associated with the package to generate the handling instruction.

9. A method as claimed in claim 1 further comprising the steps of:
    estimating a time of delivery of the package based on the scanned data; and
    notifying a shipper, consignee, or both, of the estimated time of delivery of the package.

* * * * *

UNITED STATES PATENT AND TRADEMARK OFFICE
CERTIFICATE OF CORRECTION

PATENT NO. : 7,516,889 B2  
APPLICATION NO. : 11/464985  
DATED : April 14, 2009  
INVENTOR(S) : Baldassari et al.

Page 1 of 1

It is certified that error appears in the above-identified patent and that said Letters Patent is hereby corrected as shown below:

<u>Column 10,</u>

Line 14, "though" should read --through--.

<u>Column 26,</u>

Line 22, "alone" should read --along--.

Signed and Sealed this

Thirtieth Day of June, 2009

JOHN DOLL  
*Acting Director of the United States Patent and Trademark Office*